US012771437B2

(12) United States Patent
Chen et al.

(10) Patent No.: US 12,771,437 B2
(45) Date of Patent: Oct. 20, 2026

(54) RF FRONTEND FOR UNIVERSAL 5G/6G AND LEO SATELLITE COMMUNICATION

(71) Applicant: Swiftlink Technologies Inc., Richmond (CA)

(72) Inventors: Thomas Shoutao Chen, Richmond (CA); Donuwan Navaratne, Richmond (CA); Robert Hill, Medford, OR (US); Aqeel Ahmad, Toronto (CA); Heba El Sawaf, Richmond (CA); Wenjing Wu, Richmond (CA)

(73) Assignee: SWIFTLINK TECHNOLOGIES INC., Richmond (CA)

( * ) Notice: Subject to any disclaimer, the term of this patent is extended or adjusted under 35 U.S.C. 154(b) by 5 days.

(21) Appl. No.: 18/901,936

(22) Filed: Sep. 30, 2024

(65) Prior Publication Data

US 2025/0385442 A1 Dec. 18, 2025

Related U.S. Application Data

(60) Provisional application No. 63/660,036, filed on Jun. 14, 2024.

(51) Int. Cl.
*H04B 7/185* (2006.01)
*H01P 5/18* (2006.01)
(Continued)

(52) U.S. Cl.
CPC ........... *H04B 7/18513* (2013.01); *H01P 5/18* (2013.01); *H01Q 21/0006* (2013.01); *H01Q 21/24* (2013.01); *H04L 25/0272* (2013.01)

(58) Field of Classification Search
CPC ......... H04B 7/18513; H01P 5/18; H01P 5/12; H01P 5/16; H01Q 21/0006; H01Q 21/24; H04L 25/0272
See application file for complete search history.

(56) References Cited

U.S. PATENT DOCUMENTS

| | | | |
|---|---|---|---|
| 5,010,348 | A | 4/1991 | Rene et al. |
| 5,363,072 | A | 11/1994 | Sakamoto et al. |

(Continued)

FOREIGN PATENT DOCUMENTS

| | | | |
|---|---|---|---|
| CN | 101478334 | A | 7/2009 |
| CN | 106792953 | A | 5/2017 |
| JP | 2020136881 | A | 8/2020 |

OTHER PUBLICATIONS

Del Portillo et al.,"A Technical Comparison of Three Low Earth Orbit Satellite Constellation Systems to Provide Global Broadband," 69th International Astronautical Congress (IAC), Bremen, Germany, Oct. 1-5, 2018 (15 pages).

(Continued)

*Primary Examiner* — Seung H Lee
(74) *Attorney, Agent, or Firm* — WOMBLE BOND DICKINSON (US) LLP

(57) ABSTRACT

According to one embodiment, a millimeter wave (mmWave) antenna unit includes at least one dual-polarized radiating element having a dual feed including a first feed point and a second feed point, a first antenna feed line coupled to the at least one dual-polarized radiating element at the first feed point, and a second antenna feed line coupled to the at least one dual-polarized radiating element at the second feed point. The radiating element is excited by a first signal through the first antenna feed line at a first time moment, and/or the radiating element is excited by a second signal through the second antenna feed line at a second time moment, and/or the radiating element is excited by a third signal through the first and second antenna feed lines at a third time moment.

20 Claims, 22 Drawing Sheets

100

(51) Int. Cl.

| | |
|---|---|
| ***H01Q 21/00*** | (2006.01) |
| ***H01Q 21/24*** | (2006.01) |
| ***H04L 25/02*** | (2006.01) |

(56) References Cited

U.S. PATENT DOCUMENTS

| | | | | |
|---|---|---|---|---|
| 6,072,768 | A | 6/2000 | Wiedeman et al. | |
| 6,147,648 | A * | 11/2000 | Granholm | H01Q 21/065 343/700 MS |
| 6,609,010 | B1 | 8/2003 | Dolle et al. | |
| 7,164,903 | B1 | 1/2007 | Cliff et al. | |
| 8,217,846 | B1 * | 7/2012 | Buckley | H01Q 21/064 343/730 |
| 2002/0177465 | A1 | 11/2002 | Robinett | |
| 2011/0043301 | A1 | 2/2011 | Huettner | |
| 2012/0190317 | A1 | 7/2012 | Martineau et al. | |
| 2017/0012722 | A1 | 1/2017 | Nilsson | |
| 2017/0288312 | A1 | 10/2017 | Koskiniemi et al. | |
| 2019/0221947 | A1 | 7/2019 | Zihir et al. | |
| 2020/0244302 | A1 | 7/2020 | Chi et al. | |
| 2020/0335867 | A1 * | 10/2020 | Choudhury | H01Q 9/0414 |
| 2022/0328953 | A1 | 10/2022 | Huang | |
| 2024/0006736 | A1 | 1/2024 | Rajendran et al. | |

OTHER PUBLICATIONS

Mediatek Inc., “Satellite and Terrestrial Network Convergence,” MediaTek 6G Technology White Paper, May 4, 2023 (28 pages).

* cited by examiner

RF FRONTEND FOR UNIVERSAL 5G/6G AND LEO SATELLITE COMMUNICATION

CROSS-REFERENCE TO RELATED APPLICATIONS

This application claims the benefit of priority to U.S. provisional application 63/660,036, filed on Jun. 14, 2024. The disclosure of the aforementioned patent application is hereby incorporated by reference in its entirety.

FIELD OF THE INVENTION

Embodiments of the present invention relate generally to wireless communication devices. More particularly, embodiments of the invention relate to a radio frequency (RF) frontend for universal $5^{th}$ generation (5G)/$6^{th}$ generation (6G) and low earth orbit (LEO) satellite communication.

BACKGROUND

Currently RF transceivers of a mobile terminal are designed for cellular communication with ground-based cell sites using radio waves to establish a connection with the nearest tower. A cell phone's signal, or call, is carried by a cellular tower in a given area. When the mobile terminal moves to a different area, the signal attaches to a different cellular tower for data communication. Traditionally, a RF transceiver is designed to communicate with either a cellular tower or a LEO satellite but not both.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
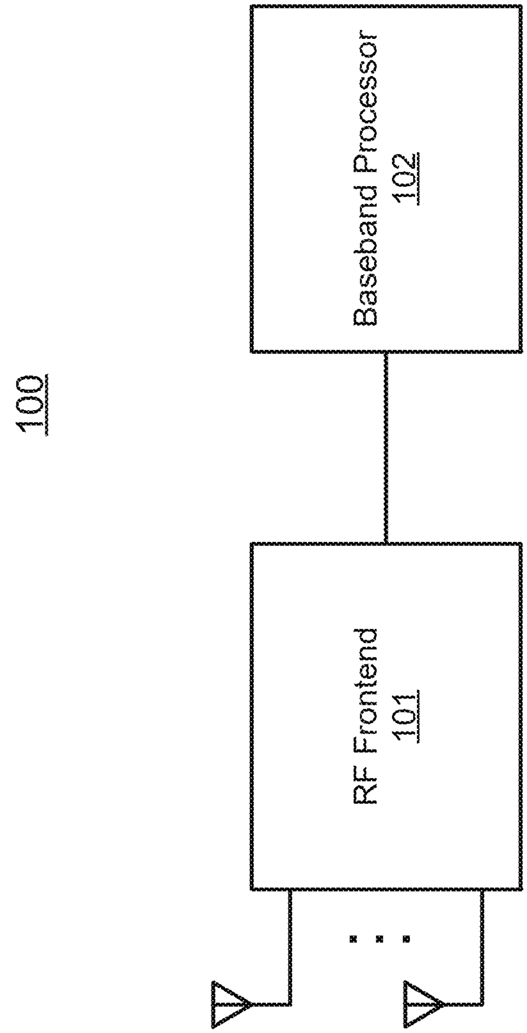
FIG. 1 is a block diagram illustrating an example of a wireless communication device according one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to a first aspect, a millimeter wave (mauve) antenna unit includes at least one dual-polarized radiating element having a dual feed including a first feed point and a second feed point, a first antenna feed line coupled to the at least one dual-polarized radiating element at the first feed point, and a second antenna feed line coupled to the at least one dual-polarized radiating element at the second feed point. The at least one dual-polarized radiating element transmits/receives a first signal through the first antenna feed line from a first antenna port at a first time moment, and/or the at least one dual-polarized radiating element transmits/receives a second signal through the second antenna feed line from a second antenna port at a second time moment, and/or the at least one dual-polarized radiating element transmits/receives a third signal through the first and second antenna feed lines from the first and second antenna ports at a third time moment. The first time moment is same or different than the second time moment and the first and second time moments are different than the third time moment. The first signal is of a first polarization, the second signal is of a second polarization, and the third signal is of a third polarization, and where the first or the second signal is used for cellular communication, and the third signal is used for low earth orbit satellite communication. The first time moment is same, or different than, the second time moment, and the first and second time moments are different than the third time moment.

In an embodiment, the first signal or the second signal is a transmit/receive packet from a cellular tower at the first or second time moment, where the third signal is a transmit/receive packet from a low earth orbit satellite at the third time moment.

In an embodiment, the at least one dual-polarized radiating element includes a square-shaped planar radiating element with the first feed point adjacent to the second feed point, and the first and second feed points situated on a surface of the planar radiating element.

In an embodiment, the at least one dual-polarized radiating element includes a first radiating element, a second radiating element, a first radiating arm coupled to the first radiating element, and a second radiating arm coupled to the second radiating element. The second radiating arm is arranged orthogonally to the first radiating arm and is separated from the first radiating arm, where the first feed point is adopted to excite the first radiating arm and the second feed point is adopted to excite the second radiating arm.

In an embodiment, operating frequencies of the antenna unit is approximately 18 GHz to 30 GHz, or 24 GHz to 44 GHz, or 50 GHz to 70 GHz.

In an embodiment, the first polarization is a linear vertical polarization, the second polarization is a linear horizontal polarization, and the third polarization is a left-handed circular, right-handed circular, left-handed elliptical, or right-handed elliptical polarization. In some embodiments, the first time moment is same as the second time moment. That is, the antenna unit can transmit/receive RF signals that have vertical and horizontal polarization at the same time moment. But circular polarization signal transmission requires a separate time moment. I.e., the antenna unit is not designed to transmit/receive RF signals with vertical and circular polarization at the same time moment, and the antenna unit is not designed to transmit/receive RF signals with horizontal and circular polarization at the same time moment.

In an embodiment, the third signal is converted into the first signal of the first polarization and the second signal of the second polarization by a baseband processor, and the first signal is excited at the first antenna feed line, and the second signal is excited at the second antenna feed line.

According to a second aspect, an antenna system includes a number of millimeter wave (mmWave) antenna units, each antenna unit operating with a phase shift relationship to an adjacent of the antenna units. Each of the antenna units includes at least one dual-polarized radiating element having a dual feed including a first feed point and a second feed point, a first antenna feed line coupled to the at least one dual-polarized radiating element at the first feed point, and a second antenna feed line coupled to the at least one dual-polarized radiating element at the second feed point. The at least one dual-polarized radiating element transmits/receives a first signal through the first antenna feed line from a first antenna port at a first time moment, and/or the at least one dual-polarized radiating element transmits/receives a second signal through the second antenna feed line from a second antenna port at a second time moment, and/or the at least one dual-polarized radiating element transmits/receives a third signal through the first and second antenna feed lines from the first and second antenna ports at a third time moment. The first time moment is same or different than the second time moment and the first and second time moments are different than the third time moment. The first signal is of a first polarization, the second signal is of a second polarization, and the third signal is of a third polarization, and where the first or the second signal is used for cellular communication, and the third signal is used for low earth orbit satellite communication. For example, the antenna units are in an array and can operate in parallel, and each antenna unit receive/transmit RF signals at a same time moment. Although there could an intentional or unintentional delay of the RF signal reaching one particular antenna unit relative to the others, as required by the phase delays of the beamformer design and/or its operation. In some embodiments, the antenna system is designed to have signals reach each antenna at the same time moment.

According to a third aspect, a radio frequency (RF) frontend includes an antenna system. The antenna system includes a number of millimeter wave (mmWave) antenna units, each antenna unit operating with a phase shift relationship to an adjacent of the antenna units. Each of the antenna units includes at least one dual-polarized radiating element having a dual feed including a first feed point and a second feed point, a first antenna feed line coupled to the at least one dual-polarized radiating element at the first feed point, and a second antenna feed line coupled to the at least one dual-polarized radiating element at the second feed point. The at least one dual-polarized radiating element transmits/receives a first signal through the first antenna feed line from a first antenna port at a first time moment, and/or the at least one dual-polarized radiating element transmits/receives a second signal through the second antenna feed line from a second antenna port at a second time moment, and/or the at least one dual-polarized radiating element transmits/receives a third signal through the first and second antenna feed lines from the first and second antenna ports at a third time moment. The first time moment is same or different than the second time moment and the first and second time moments are different than the third time moment. The first signal is of a first polarization, the second signal is of a second polarization, and the third signal is of a third polarization, and where the first or the second signal is used for cellular communication, and the third signal is used for low earth orbit satellite communication. The RF frontend includes a number of first transceivers to transmit/receive first signals in the first polarization, each first transceiver being coupled to a respective first antenna port of an antenna unit of the antenna units. The RF frontend includes a number of second transceivers to transmit/receive second signals in the second polarization, each second transceiver being coupled to a respective second antenna port of an antenna unit of the antenna units. Signals of a subset of the antenna units are combined coherently to form a first radiating pattern for the cellular communication and signals of the antenna units are combined coherently to form a second radiating pattern for the low earth orbit satellite communication.

In an embodiment, the RF frontend further includes a first power divider combiner (PDC) system coupled to the first transceivers to combine a number of signals into one signal or divide a signal into a number of signals in the first polarization, and a second PDC system coupled to the second transceivers to combine a number of signals into one signal or divide a signal into a number of signals in the second polarization.

In an embodiment, the RF frontend further includes a first up/down converter (UDC) coupled to the first PDC system and a second up/down converter (UDC) coupled to the second PDC system.

In an embodiment, the RF frontend further includes a controller that enables/disables transmission of a signal to each of the antenna units, and the controller further configures the first and/or second transceivers to switch to transmit mode or receive mode.

In an embodiment, a count of the plurality of millimeter wave (mmWave) antenna units is N, and where each of the plurality of antenna units is coupled to a corresponding first transceiver and a corresponding second transceiver, where N is an integer number.

In an embodiment, N is 512 and 8 antenna units are coupled to each first integrated circuit (IC) of 64 first ICs.

In an embodiment, the first and second transceivers are disposed on one or more of the first integrated circuits (ICs).

In an embodiment, the first and the second PDC systems are disposed on the plurality of first ICs and/or a portion of the first and the second PDC systems are disposed on a plurality of second ICs.

In an embodiment, the first and second UDCs are disposed on a third IC.

In an embodiment, operating frequencies of the antenna unit is approximately 18 GHz to 30 GHz, or 24 GHz to 44 GHz, or 50 GHz to 70 GHz.

In an embodiment, the first polarization is a linear vertical polarization, the second polarization is a linear horizontal polarization, and the third polarization is a left-handed circular, right-handed circular, left-handed elliptical, or right-handed elliptical polarization.

According to a fourth aspect, a wireless communication device includes one or more processors and a memory coupled to the processors to store instructions, which when executed by the processor, cause the processors to perform operations. The operations including transmitting/receiving, by a radio frequency (RF) frontend of the wireless communication device, a signal in a first polarization at a first time moment using a first communication type, determining a condition is satisfied, the condition being indicative of a switch from the first communication type to a second communication type, switching the RF frontend of the wireless communication device to communicate from the first communication type to the second communication type, and transmitting/receiving, by the RF frontend, a signal in a third polarization at a second time moment using the second communication type.

In an embodiment, the operations include transmitting/receiving a signal in a second polarization at a third time moment in the first communication type in response to an indication to switch from the second communication type to the first communication type.

In an embodiment, the operations include determining the one or more requirement factors based on performance requirements of different operations of the wireless communication device, where the condition is determined based on the one of more requirement factors and the one or more requirement factors include a required signal strength, a required throughput, a required signal-to-noise ratio, and/or a required error rate threshold.

In an embodiment, the operations include determining the one or more supply factors based on supplied performance expectations of different communication types of the wireless communication device, where the condition is determined based on the one or more supply factors and the supply factors include a supplied signal strength, a supplied throughput, a supplied signal-to-noise ratio, and/or a supplied error rate threshold for each communication type of the wireless communication device.

In an embodiment, the operations include determining actual performance factors for a current communication types of the wireless communication device, where the condition is determined based on the actual performance factors and the actual performance factors include a current signal strength, a current throughput, a current signal-to-noise ratio, and/or a current error rate threshold for the wireless communication device.

In an embodiment, the condition is calculated based on a weighted sum of the one of more requirement factors, supply factors, and/or actual performance factors for the first and/or second communication types.

In an embodiment, the condition is calculated based on a score that is equal to max(ΣS, ΣA)−ΣR for the first communication type being greater than a predetermined threshold, where S denotes the weighted sum of the one of more supply factors, A denotes the weighted sum of the one of more actual performance factors, and R denotes the weighted sum of the one of more requirement factors.

In an embodiment, the condition is calculated based on a score max(SΣ, ΣA)−ΣR for the second communication type being greater than the score for the first communication type.

In an embodiment, the first communication type is cellular communication, the second communication type is low earth orbit satellite communication.

In an embodiment, operating frequencies of the antenna unit is approximately 18 GHz to 30 GHz, or 24 GHz to 44 GHz, or 50 GHz to 70 GHz.

In an embodiment, the first polarization is a linear vertical polarization, the second polarization is a linear horizontal polarization, and the third polarization is a left-handed circular, right-handed circular, left-handed elliptical, or right-handed elliptical polarization.

In an embodiment, the RF frontend includes an antenna system switchable between the first communication type and the second communication type, the antenna system including a number of millimeter wave (mmWave) antenna units, each antenna unit operating with a phase shift relationship to an adjacent of the antenna units and each of the plurality of antenna units includes at least one dual-polarized radiating element having a dual feed including a first feed point and a second feed point.

According to a fifth aspect, a Wilkinson power divider/combiner (WPDC) circuit includes a pair of first differential ports including a Vin+ port and a Vin− port, a pair of second differential ports including a Vout1+ port and a Vout1− port, and a pair of third differential ports including a Vout2+ port and a Vout2− port. The WPDC circuit includes a first transformer winding having a first end coupled to the Vin+ port and a second end coupled to the Vin− port, a second transformer winding having a first end coupled to the Vout1+ port and a second end coupled to the Vout1− port, the second transformer winding being magnetically coupled to a first portion of the first transformer winding, and a third transformer winding having a first end coupled to the Vout2+ port and a second end coupled to the Vout2− port, the third transformer winding being magnetically coupled to a second portion of the first transformer winding. For a signal-division mode, the pair of first differential ports receives a first differential signal and the WPDC circuit divides the first differential signal into a second differential signal at the second differential ports and a third differential signal at the third different ports. For a signal-divisional mode, the pair of second differential ports receives a second differential signal at the second differential ports, the pair of third differential ports receives a third differential signal at the third differential ports, and the WPDC circuit combines the second differential signal and the third differential signal into a first differential signal at the first differential ports.

In an embodiment, the first portion of the first transformer winding includes two revolutions of windings around a first center point and the second portion of the first transformer winding includes two revolutions of windings around a second center point.

In an embodiment, a mid-section of a winding of the first portion is coupled to a ground port, a mid-section of a winding of the second portion is coupled to the ground port, a mid-section of the second transformer winding is coupled to the ground port, and a mid-section of the third transformer winding is coupled to the ground port.

In an embodiment, the first portion of the first transformer winding mirrors the second portion of the first transform winding along a first axis, where the second transformer winding mirrors the third transformer winding along the first axis.

In an embodiment, the second transformer winding includes a revolution with an area of a full circle and a revolution with an area of a half circle, where the third transformer winding includes a revolution with an area of a full circle and a revolution with an area of a half circle.

In an embodiment, the second transformer winding includes a revolution with an area of a full polygon shape and a revolution with an area of a half polygon shape, where the third transformer winding includes a revolution with an area of a full polygonal shape and a revolution with an area of a half polygon shape.

In an embodiment, the WPDC circuit further includes a pair of first capacitors, each having a first end coupled to one of the first differential ports and a second end coupled to the ground port.

In an embodiment, the WPDC circuit further includes a pair of second capacitors, each having a first end coupled to one of the second differential ports and a second end coupled to the ground port.

In an embodiment, the WPDC circuit further includes a pair of third capacitors, each having a first end coupled to one of the third differential ports and a second end coupled to the ground port.

In an embodiment, each capacitor of the pair of second capacitors or the pair of third capacitors has a same capacitance value.

In an embodiment, the WPDC circuit further includes a first resistance of $2*z_0$ coupled between the first end of the second transformer winding and the first end of the third transformer winding, and a second resistance of $2*z_0$ coupled between the second end of the second transformer winding and the second end of the third transformer winding, where $z_0$ is a matching impedance of the WPDC circuit for outputs Vout1 and Vout2.

In an embodiment, a dimension of the WPDC circuit is 650 μm by 450 μm.

In an embodiment, an operating frequency range of the WPDC circuit is approximately 18 GHz to 30 GHz, or 24 GHz to 44 GHZ, or 50 GHz to 70 GHz.

In an embodiment, the WPDC circuit is a 2-to-1 circuit that operates simultaneously in a forward direction and in a reverse direction.

According to a sixth aspect, a power divider combiner (PDC) system includes a plurality of Wilkinson power divider/combiner (WPDC) circuits coupled in M stages, where a count of the WPDC circuits is power(2, M)−1 and M is an integer number greater than 1. Each WPDC circuit includes a pair of first differential ports including a Vin+ port and a Vin− port, a pair of second differential ports including a Vout1+ port and a Vout1− port, and a pair of third differential ports including a Vout2+ port and a Vout2− port. The WPDC circuit includes a first transformer winding having a first end coupled to the Vin+ port and a second end coupled to the Vin− port, a second transformer winding having a first end coupled to the Vout1+ port and a second end coupled to the Vout1− port, the second transformer winding being magnetically coupled to a first portion of the first transformer winding, and a third transformer winding having a first end coupled to the Vout2+ port and a second end coupled to the Vout2− port, the third transformer winding being magnetically coupled to a second portion of the first transformer winding. For a signal-division mode, the pair of first differential ports receives a first differential signal and the WPDC circuit divides the first differential signal into a second differential signal at the second differential ports and a third differential signal at the third different ports. For a signal-combination mode, the pair of second differential ports receives a second differential signal at the second differential ports, the pair of third differential ports receives a third differential signal at the third differential ports, and the WPDC circuit combines the second differential signal and the third differential signal into a first differential signal at the first differential ports.

According to a seventh aspect, a radio frequency (RF) frontend includes an antenna system. The antenna system includes a number of millimeter wave (mmWave) antenna units. Each antenna unit operating with a phase shift relationship to an adjacent of the antenna units and each of the antenna units includes at least one dual-polarized radiating element having a dual feed including a first feed point and a second feed point. The RF frontend includes a number of first transceivers to transmit/receive first signals in a first polarization, each first transceiver being coupled to a respective first antenna port of an antenna unit of the plurality of antenna units. The RF frontend includes a plurality of second transceivers to transmit/receive second signals in a second polarization, each second transceiver being coupled to a respective second antenna port of an antenna unit of the plurality of antenna units. The RF frontend includes a first power divider combiner (PDC) system coupled to the first transceivers to combine a plurality of signals into one signal or divide a signal into a plurality of signals in the first polarization and a second power divider combiner (PDC) system coupled to the second transceivers to combine a plurality of signals into one signal or divide a signal into a plurality of signals in the second polarization. The first or second PDC system includes a number of Wilkinson power divider/combiner (WPDC) circuits coupled in M stages, where a count of the WPDC circuits is power(2,M)−1 and Mis an integer number greater than 1. Each WPDC circuit includes a pair of first differential ports including a Vin+ port and a Vin− port, a pair of second differential ports including a Vout1+ port and a Vout1− port, and a pair of third differential ports including a Vout2+ port and a Vout2− port. The WPDC circuit includes a first transformer winding having a first end coupled to the Vin+ port and a second end coupled to the Vin− port, a second transformer winding having a first end coupled to the Vout1+ port and a second end coupled to the Vout1− port, the second transformer winding being magnetically coupled to a first portion of the first transformer winding, and a third transformer winding having a first end coupled to the Vout2+ port and a second end coupled to the Vout2− port, the third transformer winding being magnetically coupled to a second portion of the first transformer winding. For a signal-division mode, the pair of first differential ports receives a first differential signal and the WPDC circuit divides the first differential signal into a second differential signal at the second differential ports and a third differential signal at the third different ports. For a signal-combination mode, the pair of second differential ports receives a second differential signal at the second differential ports, the pair of third differential ports receives a third differential signal at the third differential ports, and the WPDC circuit combines the second differential signal and the third differential signal into a first differential signal at the first differential ports.

FIG. 1 is a block diagram illustrating an example of a wireless communication device according one embodiment of the invention. Referring to FIG. 1, wireless communication device 100, also simply referred to as a wireless device, includes, amongst others, an RF frontend module 101 and a baseband processor 102. Wireless device 100 can be any kind of wireless communication devices such as, for example, mobile phones, laptops, tablets, network appliance devices (e.g., Internet of thing or IOT appliance devices), drone, infrastructure, vehicle, watercraft, aircraft, robotic devices, etc.

In a radio receiver circuit, the RF frontend is a generic term for all the circuitry between the antenna up to and including the mixer stage. It consists of all the components in the receiver that process the signal at the original incoming radio frequency, before it is converted to a lower intermediate frequency (IF). In microwave and satellite receivers it is often called the low-noise block (LNB) or low-noise downconverter (LND) and is often located at the antenna, so that the signal from the antenna can be transferred to the rest of the receiver at the more easily handled intermediate frequency. A baseband processor is a device (a chip or part of a chip) in a network interface that manages all the radio functions (all functions that require an antenna).

In one embodiment, RF frontend module 101 includes one or more RF transceivers, where each of the RF transceivers transmits and receives RF signals within a particular frequency band (e.g., a particular range of frequencies such as non-overlapped frequency ranges) via one of a number of RF antennas. The RF frontend IC chip further includes a frequency synthesizer coupled to the RF transceivers. The frequency synthesizer generates and provides a local oscillator (LO) signal to each of the RF transceivers to enable the RF transceiver to mix, modulate, and/or demodulate RF signals within a corresponding frequency band. The RF transceivers and the frequency synthesizer may be integrated within a single IC chip as a single RF frontend IC chip or package.

Figure 2:
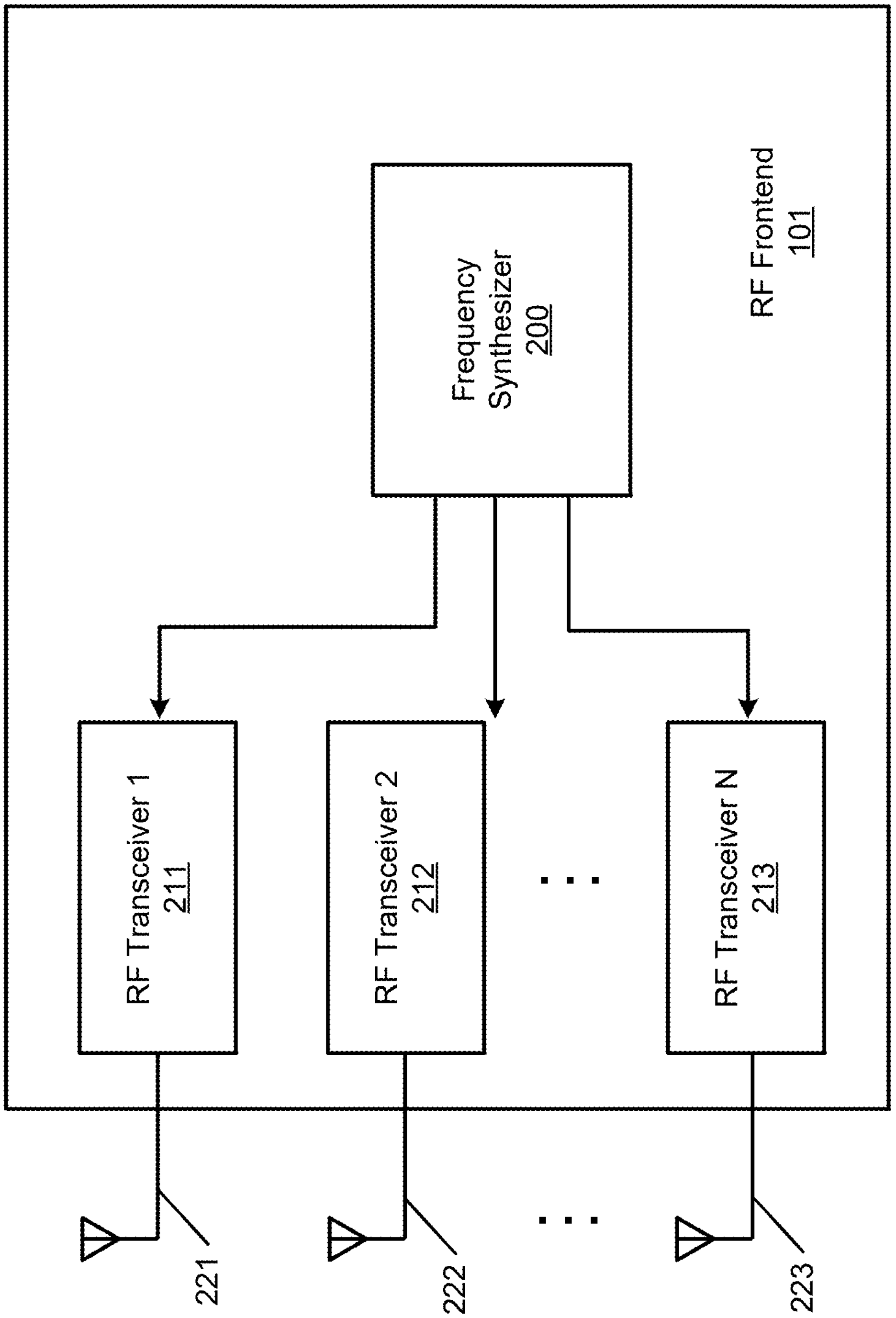
FIG. 2 is a block diagram illustrating an example of an RF frontend integrated circuit according to one embodiment.

FIG. 2 is a block diagram illustrating an example of an RF frontend integrated circuit according to one embodiment of the invention. Referring to FIG. 2, RF frontend 101 includes, amongst others, a frequency synthesizer 200 coupled to one or more RF transceivers 211-213. Each of transceivers 211-213 is configured to transmit and receive RF signals within a particular frequency band or a particular range of RF frequencies via one of RF antennas 221-223. In one embodiment, each of transceivers 211-213 is configured to receive a LO signal from frequency synthesizer 200. The LO signal is generated for the corresponding frequency band. The LO signal is utilized to mix, modulate, demodulated by the transceiver for the purpose of transmitting and receiving RF signals within the corresponding frequency band.

In some embodiments, each of RF antennas 221-223 is an element of a phased array antennas. In some embodiments, each of transceivers 211-213 is configured to transmit and receive RF signals with a particular phase shift and amplitude at the individual antennas 221-223 of the array to create a high-gain, directional beam. This beam can be electronically steered in a particular direction. In some embodiments, a beam is electronically steered without having to steer RF antennas 221-223 mechanically.

Figure 3:
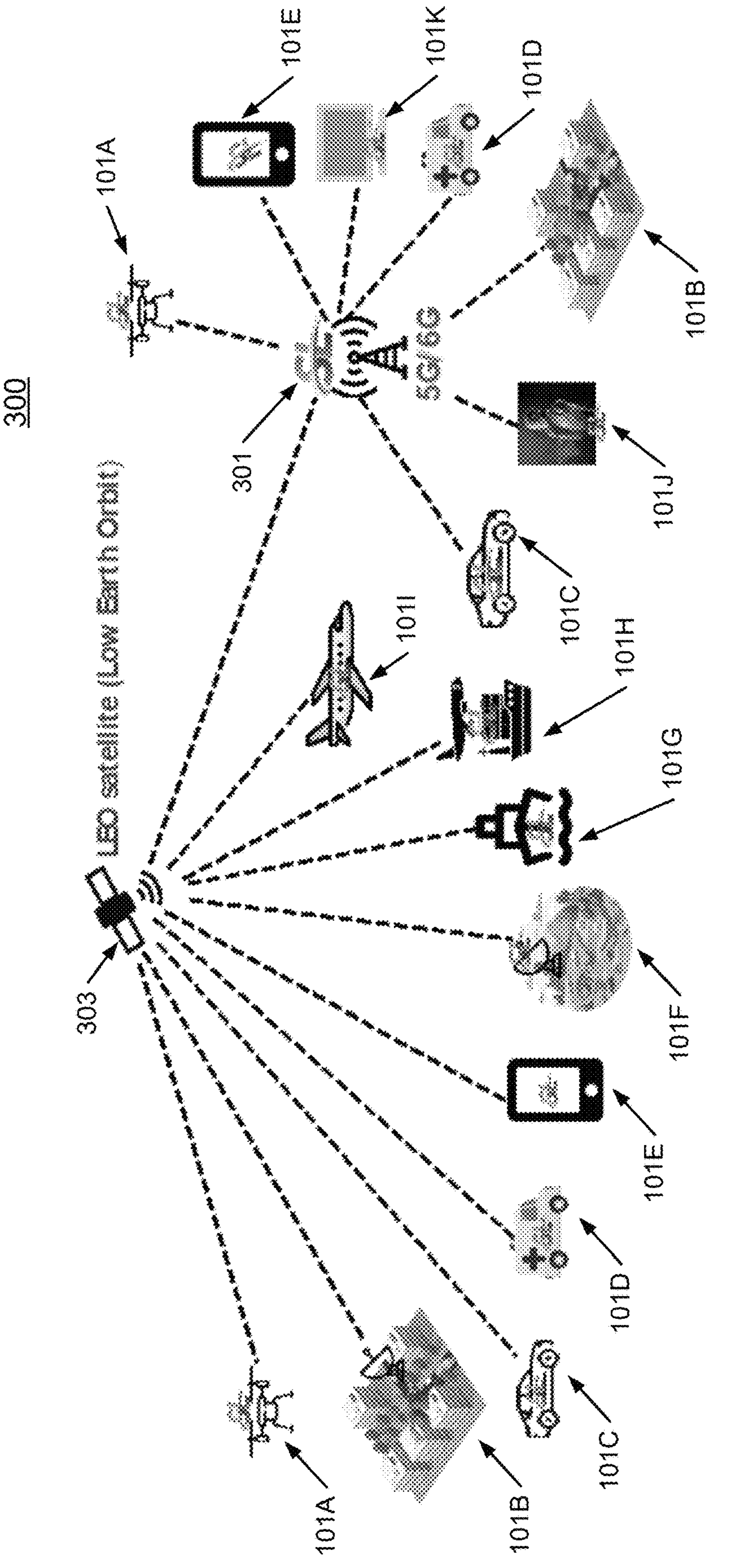
FIG. 3 is a block diagram illustrating an example of a communication network according one embodiment.

FIG. 3 is a block diagram illustrating an example of a communication network 300 according one embodiment. Communication network 300 can include one or more terrestrial towers 301 for terrestrial communication and one or more satellites 303 for satellite communication. Terrestrial communication can include $5^{th}$ generation (5G), 5G advanced (5.5G), or $6^{th}$ generation (6G) network technology and operating at millimeter wave (mmWave) frequencies, such as, 28 GHz, 37 GHz, 39 GHz, etc. Satellite 303 can be a LEO satellite operating at K band (18-26.5 GHZ), Ku band (12-18 GHz), and/or Ka band (26.5-40 GHz) frequencies, or a combination thereof. As shown in FIG. 3, communication network 300 can include wireless communication devices 101A-101J. Each of wireless devices 101A-101J can represent wireless device 101 of FIG. 1. In some embodiments, wireless devices 101A-101J can send/receive data via terrestrial towers 301 at a first time moment. In some embodiments, wireless devices 101A-101J can switch to send/receive data via satellite 303 at another time moment.

Figure 4:
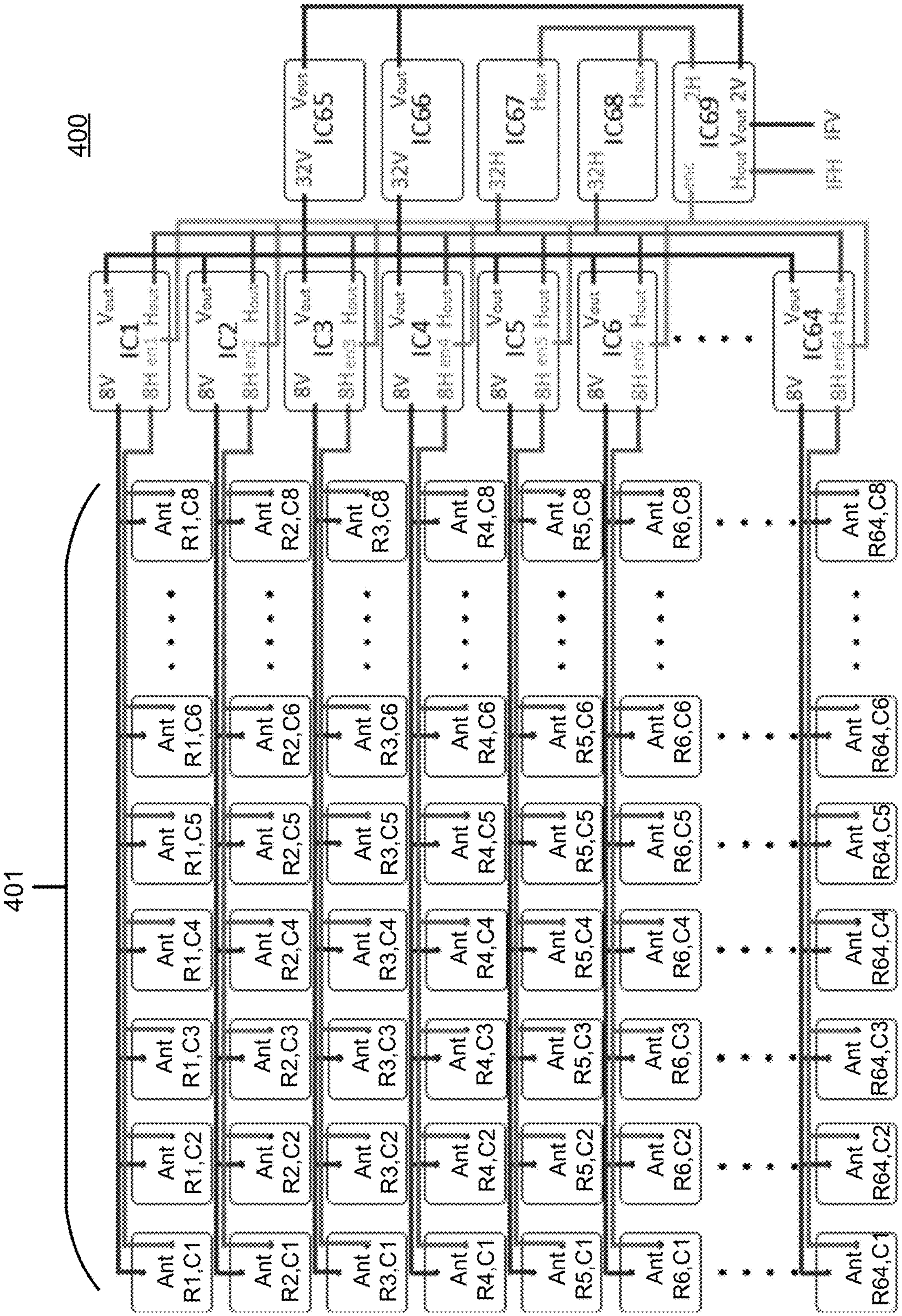
FIG. 4 is a block diagram illustrating a combined cellular and satellite communication beamformer circuit according to one embodiment.

FIG. 4 is a block diagram illustrating a combined cellular and satellite communication beamformer circuit 400 according to one embodiment. Beamformer circuit 400 can represent frontend 101 of FIG. 1. Beamformer circuit 400 can be used for directional signal transmission and/or reception. In an embodiment, beamformer circuit 400 includes antenna array 401 and ICs 1-69. Antenna array 401 can include a number of antenna units, e.g., Ant R1, C1 . . . R64, C8. In some embodiments, the antenna units can be disposed in a linear, planar, or a 3D grid pattern. Each of antenna units can be controlled electronically by a controller to transmit/receive a signal with a particular phase shift and amplitude such that the combined signals of antenna array 401 at particular angles interfere constructively while at other angles interference destructively. This way, the combined signals achieve a high gain (directivity).

Referring to FIG. 4, in one embodiment, antenna array 401 can include 512 antenna units, in a planar pattern of 64 rows and 8 columns. Each row of antenna units can be electronically coupled to one of IC1-IC64. In one embodiment, a controller, at IC69, can send enable signals to IC1-IC64 to enable the transmit/receive of a particular antenna unit. In some embodiments, receive signals (vertical and horizontal polarization) of antenna array 401 are combined at IC1-IC69. In some embodiments, individual transmit signals (vertical and horizontal polarization) of antenna units of antenna array 401 are generated at IC1-IC69. Here, RF signals at IC1-IC64 can be combined/divided at IC65-IC68, and/or up/down covert at IC 69 to generate intermediate frequency (IF) signals. The IF signals can be down converted for further processing at a baseband processor or the baseband processor can up convert a baseband signal to IF signals for further processing.

In some embodiments, intermediate frequency transmit signals (vertical and horizontal polarization) are upconvert at IC 69. The signals are then power divided at IC65-IC68, and are further power divided/processed for beamforming at IC1-IC64.

In some embodiments, a subset of antenna elements are used to transmit/receive signals for terrestrial communication. In some embodiments, all antenna elements are used to transmit/receive signals for satellite communication. Although the beamforming signal processing are illustrated by IC1-IC69, IC1-IC69 can be an integrated into one circuit or further divides into any number of integrated circuits.

Figure 5:
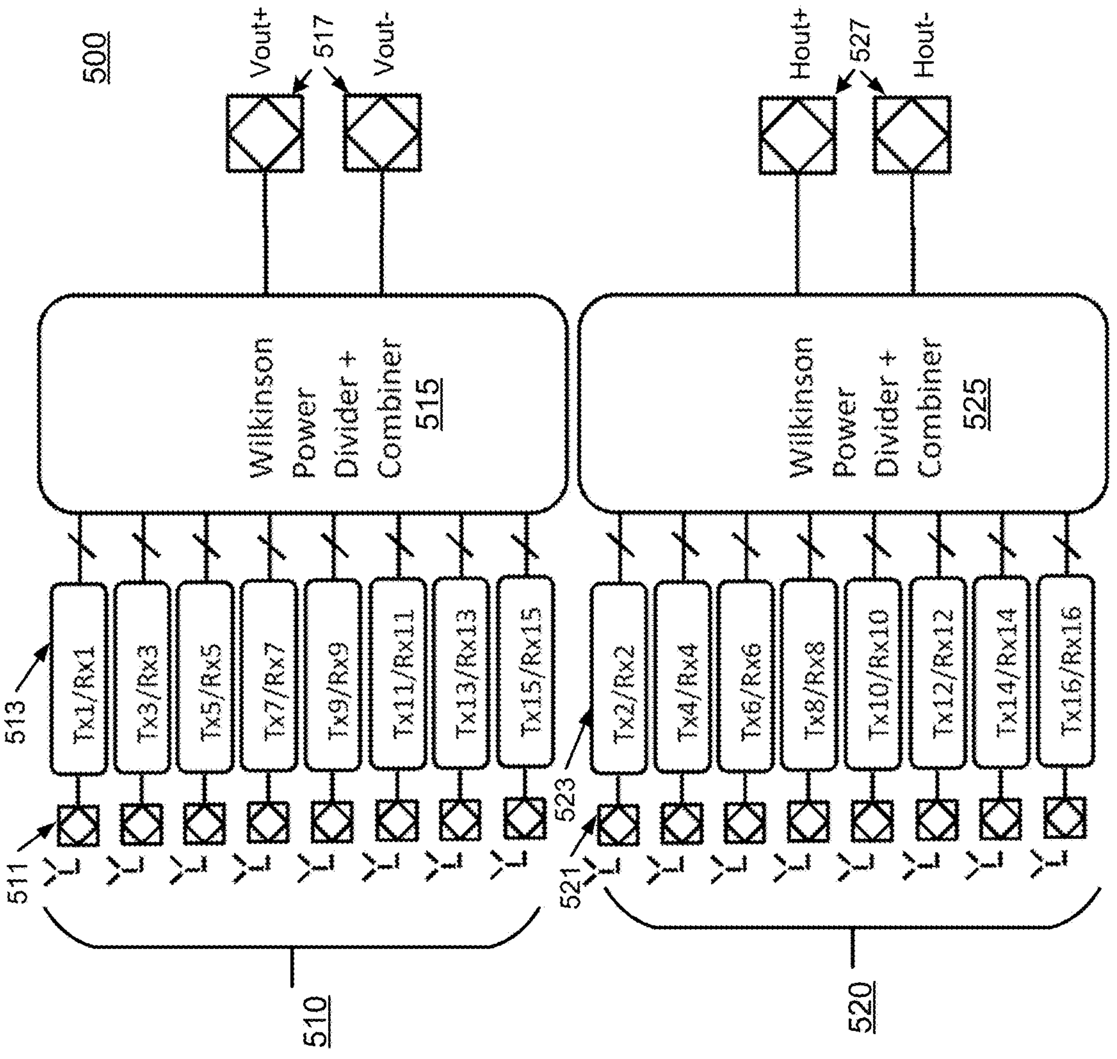
FIG. 5 is a block diagram illustrating an integrated circuit according to one embodiment.

FIG. 5 is a block diagram illustrating an integrated circuit (IC) 500 according to one embodiment. IC 500 can represent any of IC1-IC64 of FIG. 4. In one embodiment, IC 500 includes a vertical polarization transmit/receive branch 510 and horizontal polarization transmit/receive branch 520. In one embodiment, branch 510 can transmit/receive signals in vertical polarization from a row of antenna elements, such as R1, C1 to R1, C8 antenna elements. Branch 520 can transmit/receive signals in horizontal polarization from the row of antenna elements.

In one embodiment, branch 510 can include a number of antenna pads 511, transceivers (Tx/Rx) 513, Wilkinson power divider/combiner (PDC) circuit 515, and output pads 517. Branch 520 can include a number of antenna pads 521, transceivers (Tx/Rx) 523, Wilkinson power divider/combiner (PDC) circuit 525, and output pads 527.

Transceivers (Tx/Rx) 513, 523 can be controlled by a controller to electronically steer the respective RF signals of transceivers (Tx/Rx) 513, 523 for beamforming, e.g., to increase a directivity of the antenna array.

Figure 6:
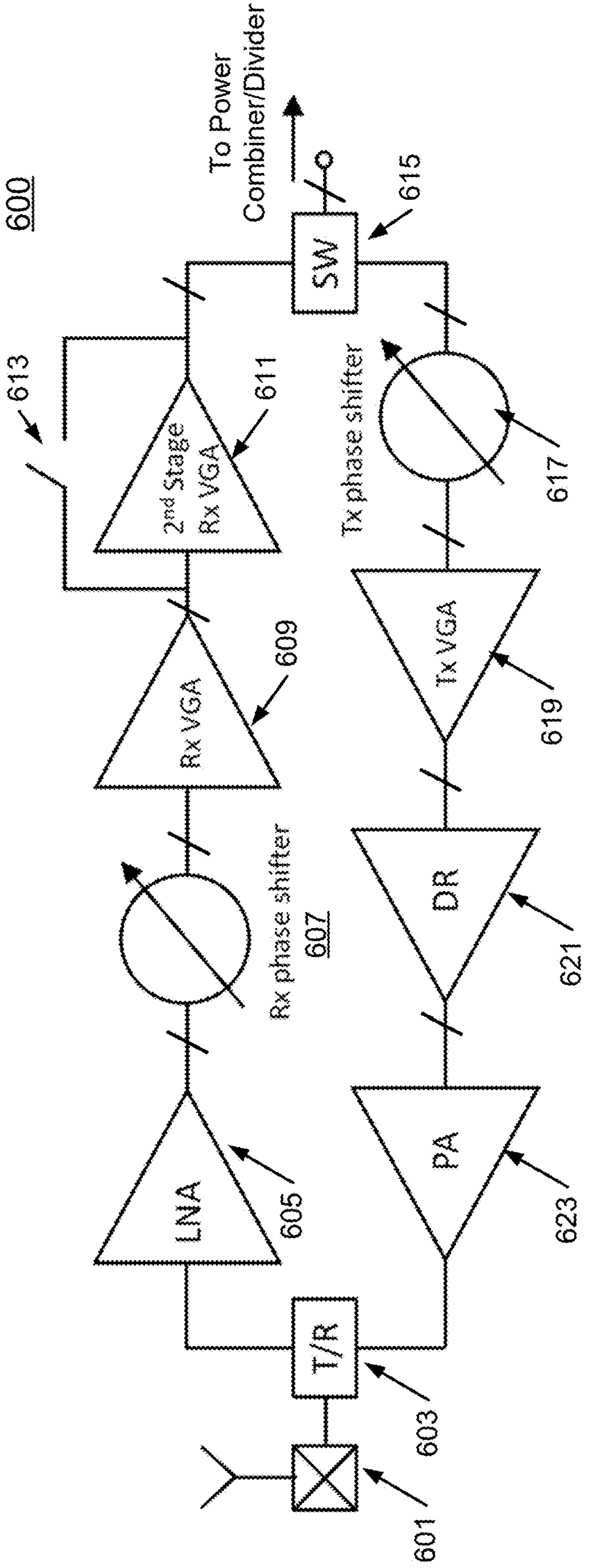
FIG. 6 is a block diagram illustrating a transceiver according to one embodiment.

FIG. 6 is a block diagram illustrating a transceiver 600 according to one embodiment. Transceiver 600 can represent transceivers 513, 523 of FIG. 5 and can be configured to transmit/receive RF signals of a single polarization for a single antenna element. Transceiver 600 is operable, by a controller, as a transmit circuit at a first time moment t1 or a receive circuit at a second time moment t2.

Referring to FIG. 6, in one embodiment, transceiver 600 includes antenna port 601, transmit/receive switch 603, low noise amplifier (LNA) 605, receive (Rx) phase shifter 607, receive variable gain amplifier (Rx VGA) 609, a second stage Rx VGA 611, switch 613 to switch second stage Rx VGA 611 into operation, and switch 613. Transceiver 600 can include transmit (Tx) phase shifter 617, Tx VGA 619, driver (DR) 621, power amplifier (PA) 623. DR 621 can drive a signal in a transmit branch.

In one embodiment, LNA 605 can receive a single-ended signal and generate a differential signal, PA 623 can receive a differential signal and generate a single-ended signal. Phase shifters can apply a phase shift to a respective RF signal. The phase shift can be used for the beamforming. VGA can control an amplitude of the RF signal. In one embodiment, T/R 603 is a single-ended component, and components 607-623 are differential components.

In one embodiment, LNA 605 and PA 623 are single-ended components and T/R 603 has a single-ended connection point at antenna port 601 and differential ended connection points near LNA 605, PA 623. Each of components 603-623 can operate at mmWave frequency ranges. Although some components are described as single-ended and some are described as differential components, an actual implementation can include all differential components, all single-ended components, or a combination thereof. In some embodiments, Marchand baluns, such as balun 905, 915 of FIG. 9, can be used to convert single-ended signals to differential signals, and vice versa, depending on the implementation (single-ended or differential) of the circuit components. An implementation of a balun can be the folded Marchand balun disclosed in U.S. Pat. No. 11,791,860, titled "Ultra compact and wide band folded Marchand Balun for millimeter-wave and beyond wireless communication."

Figure 7:
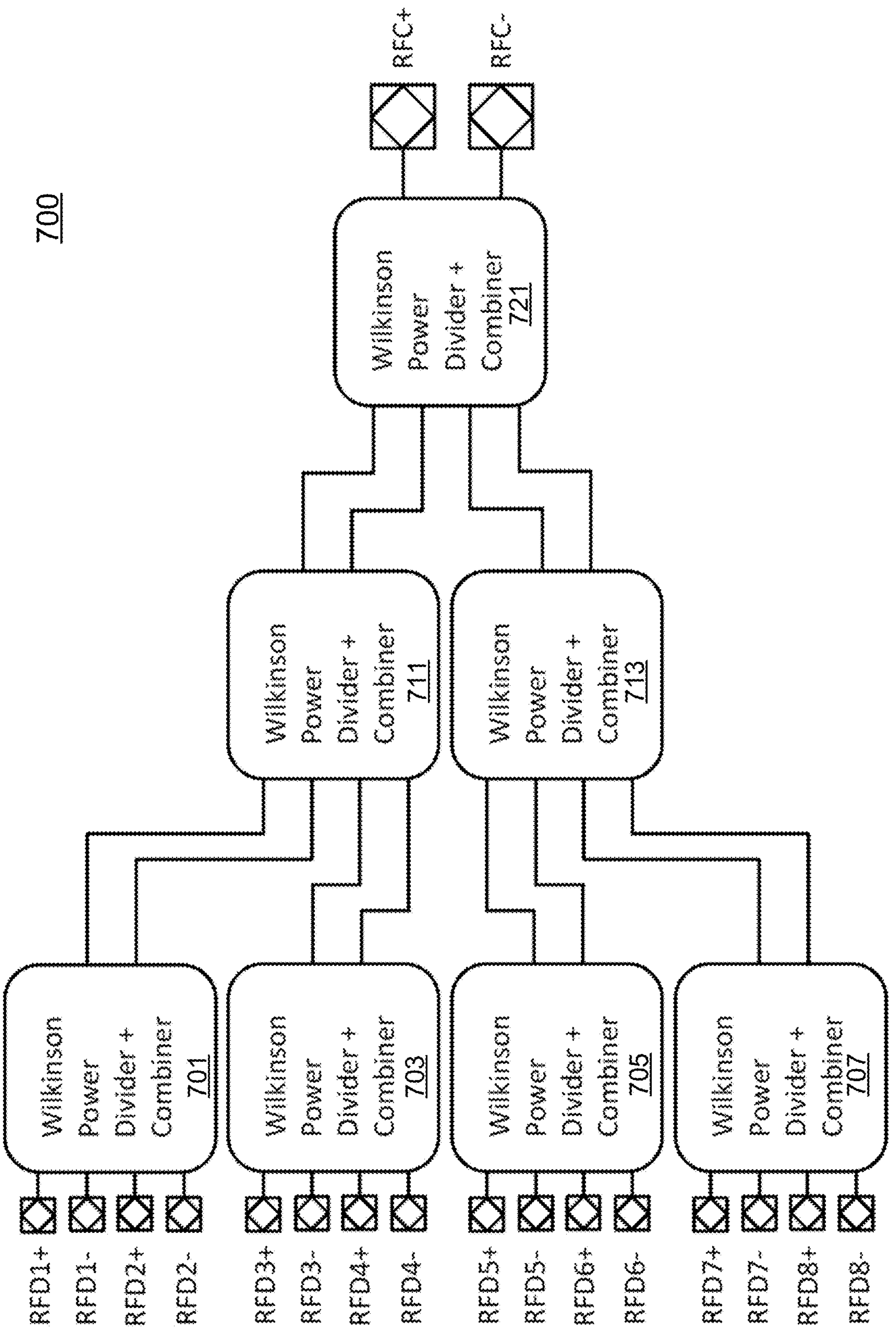
FIG. 7 is a block diagram illustrating an 8-to-1 Wilkinson power divider/combiner system according to one embodiment.

FIG. 7 is a block diagram illustrating an 8-to-1 Wilkinson power divider/combiner (WPDC) system 700 according to one embodiment. WPDC system 700 can power divide a single RF signal into 8 separate RF signals and power combine 8 separate RF signals into 1 RF signal. WPDC system 700 can represent WPDC 515, 525 of FIG. 5. In one embodiment, WPDC system 700 is a 8-to-1 WPDC that includes 7 WPDC 2-to-1 circuits, where power (2, M)−1 is equal to 7 (the number of 2-to-1 circuits), and M is a number of stages in the Wilkinson power combiner/divider system. Here, there are 3 stages of WPDC 2-to-1 circuits for the 7 WPDC 2-to-1 circuits, e.g., 1st stage with components 701-707, 2nd stage with components 711-713, and 3rd stage with component 721. In some embodiments, the WPDC 2-to-1 circuits are differential components. In some embodiments, the WPDC 2-to-1 circuits are single-ended components.

Figure 8:
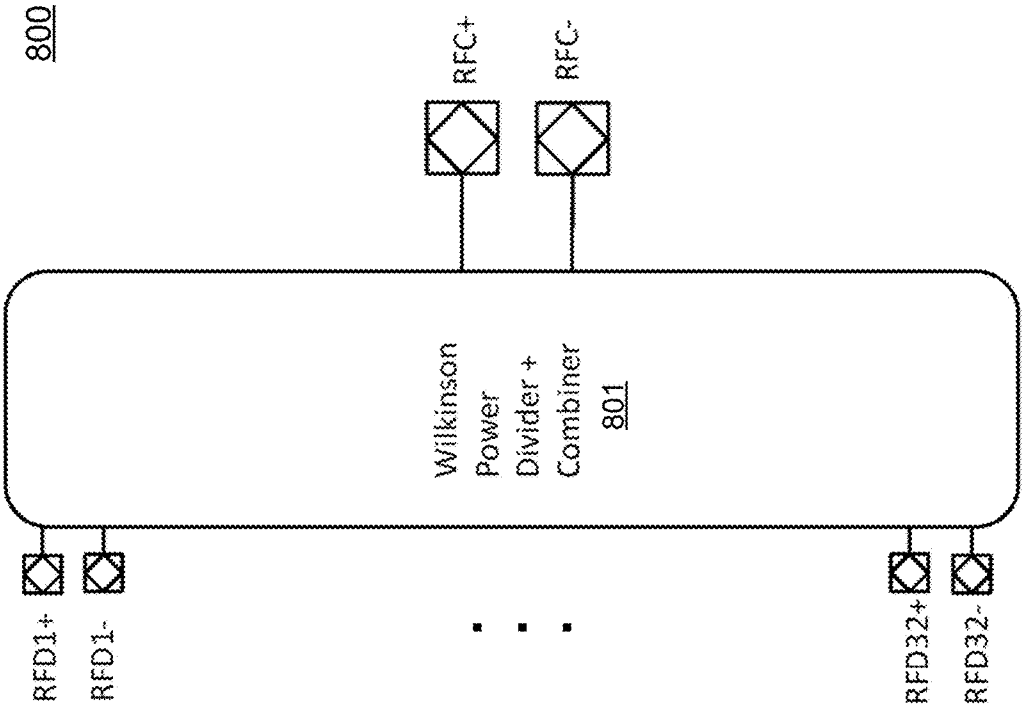
FIG. 8 is a block diagram illustrating an integrated circuit according to one embodiment.

FIG. 8 is a block diagram illustrating an integrated circuit 800 according to one embodiment. IC 800 can represent ICs 65-68 of FIG. 5. In one embodiment, IC 800 includes WPDC 801. WPDC 801 can be a 32-to-1 circuit. WPDC 801 can divide a single RF signal into 32 separate RF signals and combine 32 separate RF signals into 1 RF signal. In one embodiment, WPDC 801 includes 31 WPDC 2-to-1 circuits. In one embodiment, power (2, M)−1 is equal to 32, and M is equal to 5 for 5 stages of WPDC 2-to-1 circuits. The 31 WPDC 2-to-1 circuits can include a first stage having 16 WPDC 2-to-1 circuits, a second stage having 8 WPDC 2-to-1 circuits, a third stage having 4 WPDC 2-to-1 circuits, a fourth stage having 2 WPDC 2-to-1 circuits, and a fifth stage having one WPDC 2-to-1 circuit.

Figure 9:
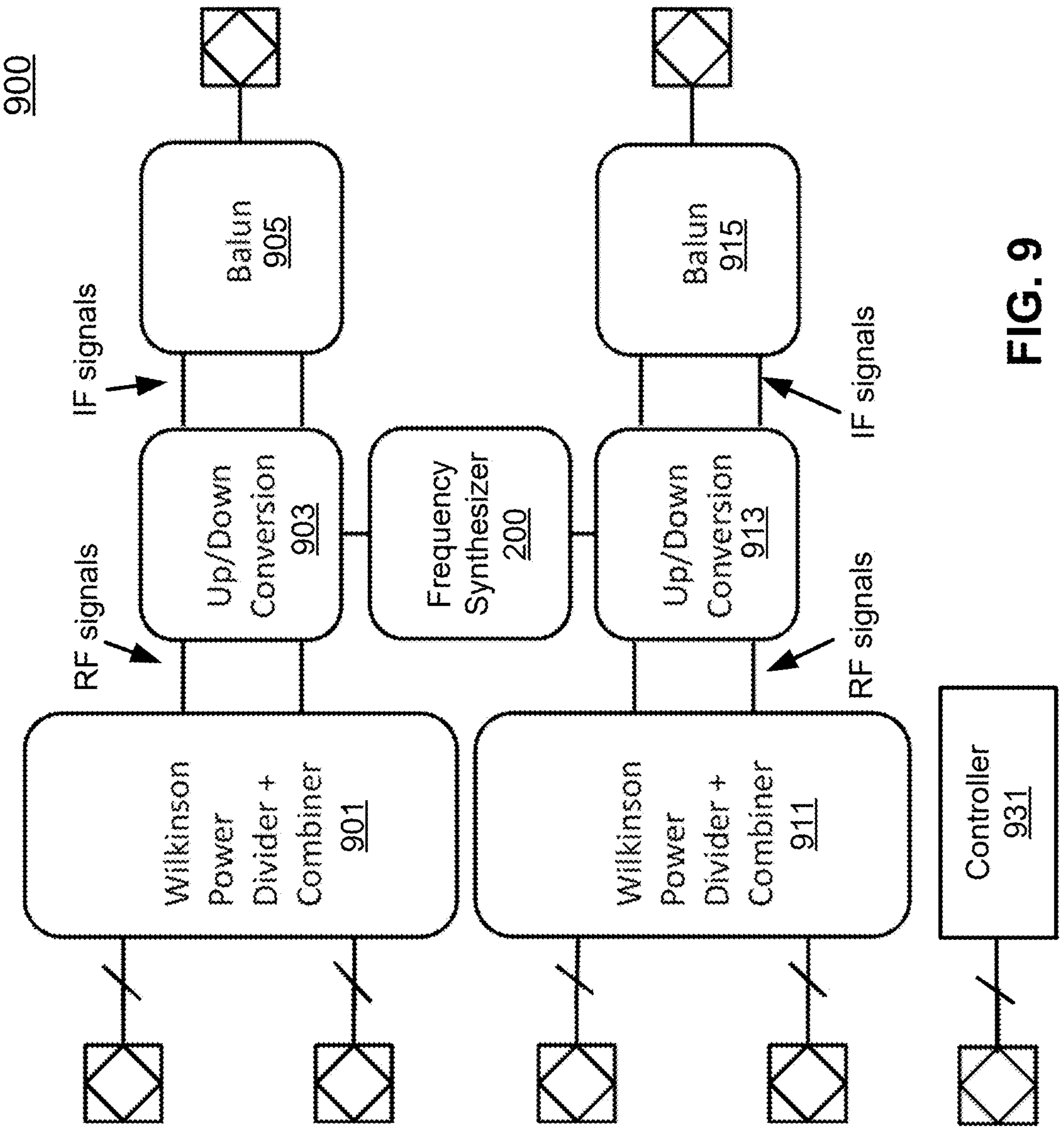
FIG. 9 is a block diagram illustrating an integrated circuit 69 according to one embodiment.

FIG. 9 is a block diagram illustrating an integrated circuit 900 according to one embodiment. IC 900 can represent IC 69 of FIG. 5. IC 900 can receive 2 V and 2 H differential RF signals, combine and down covert to single-ended V and H IF signals. IC 900 can also receive single-ended V and H IF signals and up convert to 2 V and 2 H differential RF signals. In one embodiment, IC 900 includes WPDC 901, up/down conversion unit 903, balun 905, WPDC 911, up/down conversion unit 913, balun 915, and frequency synthesizer 200. WPDC 901 can be a 2-to-1 WPDC circuit that combines two vertical polarization signals into one vertical polarization signal. Up/down conversion unit 903 can be a differential component that down/up converts a vertical polarization RF/IF signal into an IF/RF signal. Balun 905 can convert a vertical polarization differential IF signal to single-ended IF signal. Frequency synthesizer 200 can provide a LO signal to Up/down conversion units 903, 913. WPDC 911 can be a 2-to-1 WPDC circuit that combines two horizontal polarization signals into a horizontal polarization signal. Up/down conversion unit 913 can be a differential component that down/up converts a horizontal polarization RF/IF signal into an IF/RF signal. Balun 915 can convert a horizontal polarization differential IF signal to single-ended IF signal.

In one embodiment, IC 900 includes controller 931 that generates enable signals to control the transmit/receive components of individual transceiver to drive a transmit signal for each antenna elements of an antenna array, such as antenna array 401 of FIG. 4. The enable signals can enable a subset of antenna units for terrestrial communication or can enable all antenna units for satellite communication.

In one embodiment, controller 931 can control the voltage gains, and phase shift of each transceiver of IC1-IC64, by controlling the Rx VGA 609, Rx VGA 611, switch 613, Tx VGA 619, and/or Tx phase shifter 617 of transceiver 600 of FIG. 6. In one embodiment, controller 931 controls switch 613 to bypass Rx VGA 611 for terrestrial communication. In one embodiment, controller 931 controls switch 613 to use Rx VGA 611 to increase the receive gain for space satellite communication. In some embodiments, controller 931 can control the switching with a condition based on a score being greater than a predetermined threshold, where the score is equal to max (ΣS, ΣA)−ΣR for a respective communication type, where S denotes the weighted sum of one of more supply factors, A denotes the weighted sum of one of more actual performance factors, and R denotes the weighted sum of one of more requirement factors.

The requirement factors can include a required signal strength, a required throughput, a required signal-to-noise ratio, and/or a required error rate threshold. The supply factors can include a supplied signal strength, a supplied throughput, a supplied signal-to-noise ratio, and/or a supplied error rate threshold for each communication type of the wireless communication device. The actual performance factors can include a current signal strength, a current throughput, a current signal-to-noise ratio, and/or a current error rate threshold for the wireless communication device. The requirement factors can be specified by an app or the operating system (OS) of the wireless communication device. For example, an app may require a minimum threshold of quality of service, bandwidth, or latency to operate. The supply factors can be defined as the expected values of the respective communication type. The actual performance factors can be determined as the actual performance values observed by the communication device/network when the communication device is communicating using the respective communication type.

In one embodiment, controller 931 can control a switch of transceiver from transmit to receive mode, and vice versa, e.g., switching of T/R 603 and SW 615 for transceiver 600 of FIG. 6.

Figure 10:
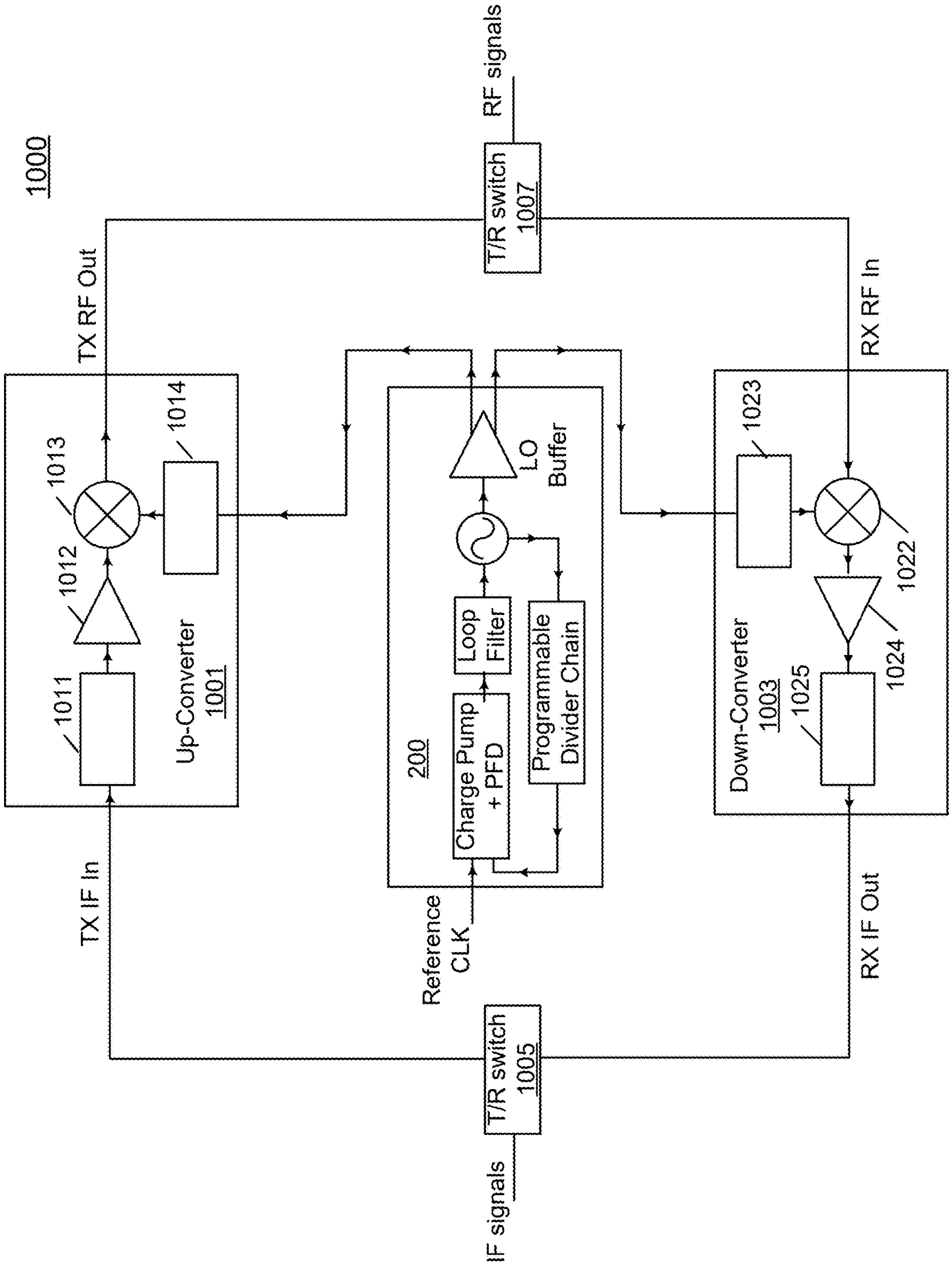
FIG. 10 is a block diagram illustrating an up-down conversion unit according to one embodiment.

FIG. 10 is a block diagram illustrating an up-down conversion unit 1000 according to one embodiment. Up-down conversion unit 1000 can represent components 903 or 913 of FIG. 9. Up-down conversion unit 1000 can be a differential component. In one embodiment, up-down conversion unit 1000 includes up-converter 1001, down-converter 1003, and T/R switches 1005-1007. Up-down converters 1001-1003 can be coupled to a frequency synthesizer 200 having a PLL circuit and an LO buffer to generate an LO signal based on a clock signal. Switches 1005-1007 can switch the up-down conversion unit from a transmit mode to a receive mode, and vice versa.

In one embodiment, up converter 1001 can include IFIQ generator 1011, IF amplifier 1012, mixer 1013, and LOIQ generation 1014. LOIQ generator 1014 can receive an LO signal from frequency synthesizer 200 to generate an LOIQ signal based on the LO signal. IFIQ generator 1011 can receive an Tx IF In signal from a modem or a baseband processor to generate a IFIQ signal. IFIQ signal can be amplified by IF amplifier 1012. The amplified IFIQ signal can mix with LOIQ signal to generate an Tx RF Out signal.

In-phase and quadrature (I/Q) signal generation is a technique that mixes two sinusoidal waves that are 90° out of phase in different proportions to generate a phase-shifted sinusoidal wave. The reference signal is denoted in-phase (I) and the signal that is shifted by 90 degrees is denoted quadrature (Q). Here, I/Q signals can be amplitude-modulated. In some embodiments, IFIQ generator 1011, LOIQ generation 1014 can be implemented by passive RLC components. In some embodiments, IQ generator can include variable delay line that delays the in-phase signal to generate a quadrature signal.

In one embodiment, down converter 1003 can include down-convert mixer 1022, LOIQ generator 1023, IF amplifier 1024, and IFIQ combiner 1025. IF amplifier 1024 can be coupled between IFIQ combiner 1025 and down-convert mixer 1022. LOIQ generator 1023 can receive a LO signal from frequency synthesizer 200 to generate a LOIQ signal based on the LO signal. Mixer 1022 can receive the LOIQ signal and mix with a Rx RF In signal to generate an IF signal. The IF signal can be further filtered by a low pass filter (not shown), and the IF signal can be amplified by IF amplifier 1024. The amplified IF signal can be combined at IFIQ combiner 1025 to generate RX IF Out signals. Although described as a differential component, up-down conversion unit 1000 can be designed as a single-ended component.

Figure 11:
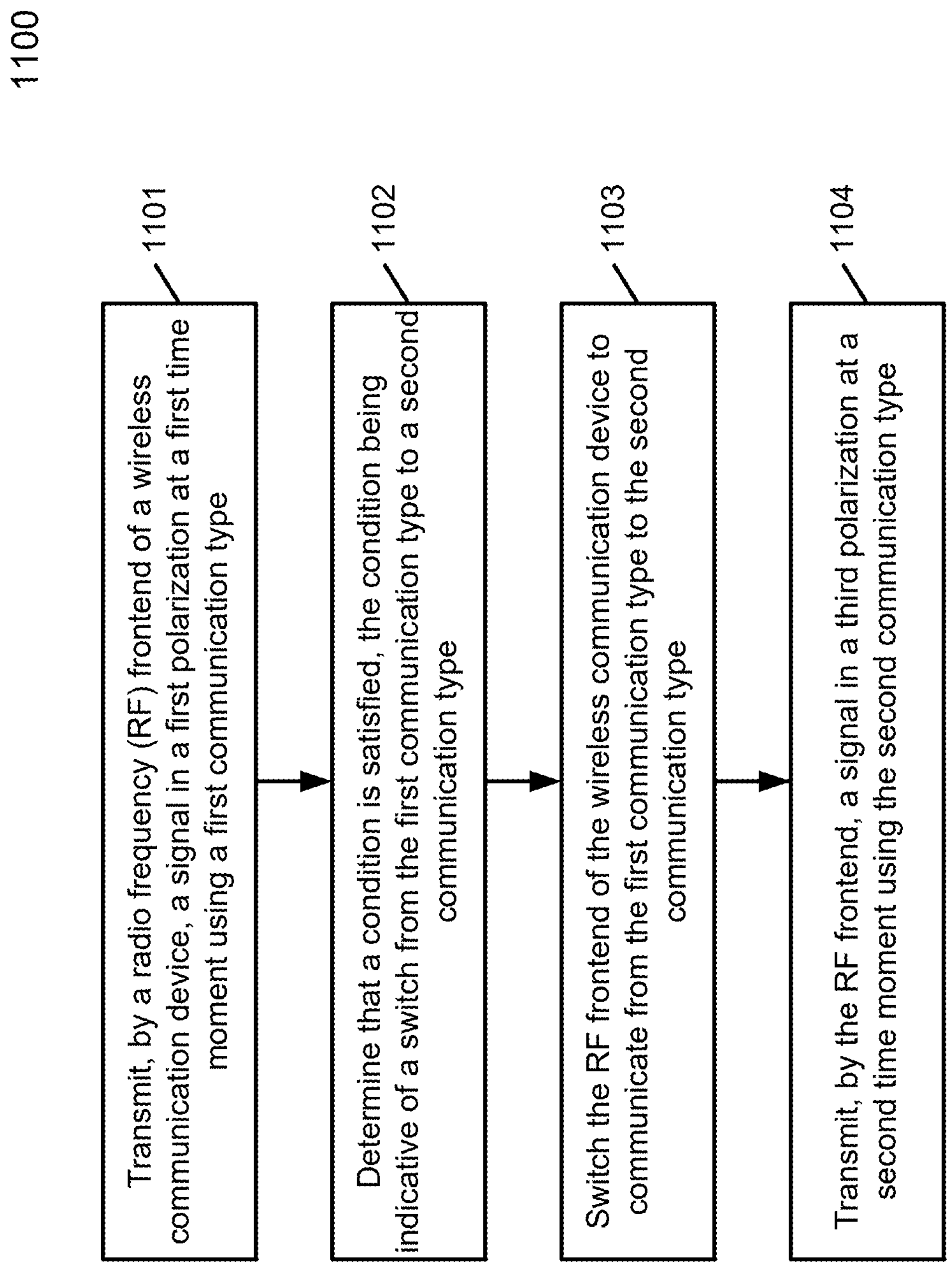
FIG. 11 is a flow diagram illustrating a process according to one embodiment.

FIG. 11 is a flow diagram illustrating a process according to one embodiment.

Processing 1100 may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments of the disclosure also relate to an apparatus for performing the operations herein. Such program instructions can be stored in a non-transitory computer readable medium. A machine-readable medium includes any mechanism for storing information in a form readable by a machine (e.g., a controller). For example, a machine-readable (e.g., computer-readable) medium includes a machine (e.g., a controller) readable storage medium (e.g., read only memory ("ROM"), random access memory ("RAM"), magnetic disk storage media, optical storage media, flash memory devices). For example, process 1100 may be performed by a RF frontend of a communication device 100 of FIG. 1 or 3.

Referring to FIG. 11, at block 1101, processing logic transmits, by a radio frequency (RF) frontend of a wireless communication device, a signal in a first polarization at a first time moment using a first communication type.

At block 1102, processing logic determines that a condition is satisfied, the condition being indicative of a switch from the first communication type to a second communication type.

At block 1103, processing logic switches the RF frontend of the wireless communication device to communicate from the first communication type to the second communication type.

At block 1104, processing logic transmits, by the RF frontend, a signal in a third polarization at a second time moment using the second communication type.

In one embodiment, processing logic further transmits a signal in a second polarization at a third time moment in the first communication type in response to an indication to switch from the second communication type to the first communication type. In some embodiments, the transmitting a signal of blocks 1101, 1104 can be interchanged with receiving a signal.

In one embodiment, processing logic further determines the one or more requirement factors based on performance requirements of different operations of the wireless communication device, where the condition is determined based on the one of more requirement factors and the one or more requirement factors include a required signal strength, a required throughput, a required signal-to-noise ratio, and/or a required error rate threshold.

In one embodiment, processing logic further determines the one or more supply factors based on supplied performance expectations of different communication types of the wireless communication device, where the condition is determined based on the one or more supply factors and the supply factors include a supplied signal strength, a supplied throughput, a supplied signal-to-noise ratio, and/or a supplied error rate threshold for each communication type of the wireless communication device.

In one embodiment, processing logic further determines actual performance factors for a current communication types of the wireless communication device, where the condition is determined based on the actual performance factors and the actual performance factors include a current signal strength, a current throughput, a current signal-to-noise ratio, and/or a current error rate threshold for the wireless communication device.

In one embodiment, the condition is calculated based on a weighted sum of the one of more requirement factors, supply factors, and/or actual performance factors for the first and/or second communication types.

In one embodiment, the condition is based on a score that is equal to max (ΣS, ΣA)−ΣR for the first communication type being greater than a predetermined threshold, where S denotes the weighted sum of the one of more supply factors, A denotes the weighted sum of the one of more actual performance factors, and R denotes the weighted sum of the one of more requirement factors.

In one embodiment, the condition is calculated based on a score max (ΣS, ΣA)−ΣR for the second communication type being greater than the score for the first communication type.

In one embodiment, the first communication type is cellular communication, the second communication type is low earth orbit satellite communication.

In one embodiment, operating frequencies of the antenna unit is approximately 18 GHz to 30 GHz, or 24 GHz to 44 GHz, or 50 GHz to 70 GHz.

In one embodiment, the first polarization is a linear vertical polarization, the second polarization is a linear horizontal polarization, and the third polarization is a left-handed circular, right-handed circular, left-handed elliptical, or right-handed elliptical polarization.

In one embodiment, the RF frontend includes an antenna system switchable between the first communication type and the second communication type, the antenna system includes a number of millimeter wave (mmWave) antenna units, each antenna unit operating with a phase shift relationship to an adjacent of the antenna units and each of the plurality of antenna units includes at least one dual-polarized radiating element having a dual feed including a first feed point and a second feed point.

Referring to FIG. 4, antenna array 401 can have a number of wideband polarization diverse antenna units. In one embodiment, antenna array 401 has dual-polarized antenna units. Here, a wideband antenna unit can be designed for operation in frequency ranges 18 GHz to 30 GHz, or 24 GHz to 44 GHz, or 50 GHz to 70 GHz, etc. Although some frequency ranges are provided, wideband antenna unit can be designed to operate at other frequency ranges. Note that polarization diversity refers to an antenna unit that includes one or more radiating elements with orthogonal polarizations (i.e., horizontal/vertical, ±slant 45°, Left-hand/Right-hand circular polarization etc.). The radiating elements can partition the received signals into their orthogonal parts to be processed separately. In some embodiments, the radiating elements of an antenna unit can be patch, Vivaldi, dipole, planar, bow-tie, spiral, etc. In some embodiments, the antenna unit of antenna array 401 can include radiating elements disclosed in U.S. Pat. No. 11,837,793, titled "wideband wide-beamwidth polarization diverse antenna".

Here, in order for LEO satellite communication, a design for antenna array 401 needs to have a high transmit equivalent isotropic radiated power (EIRP) of approximately +72 dBm, so that a transmitted signal strength is sufficient to reach the LEO satellite. This can be realized with a large antenna array, such as an antenna array with 512 elements.

In one embodiment, a number of (e.g., 64) beamformer ICs are required to drive the antenna elements. Here, each IC can drive 8 antenna elements. All of these ICs (e.g., IC1 to IC64) can be put into operation for satellite communication, while only a subset of the ICs need to be enabled for terrestrial communication since the EIRP requirement is lower for terrestrial communication in comparison with satellite communication. The enablement can be controlled by a controller of IC 69.

As shown in FIG. 4, the outputs from IC1-IC64 can be fed into IC65-IC68 for RF power combination. The resulting signals are fed into IC69 for RF to IF down conversion.

Figure 12A:
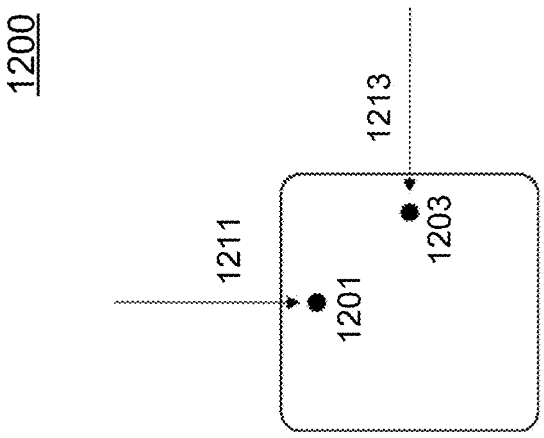
FIG. 12A is a block diagram illustrating an antenna unit according to one embodiment.

FIG. 12A is a block diagram illustrating an antenna unit 1200 according to one embodiment. Antenna unit 1200 can be an antenna unit of array 401 of FIG. 4. In one embodiment, antenna unit 1200 can be a dual feed antenna. Dual feed antenna can have two feed points 1201-1203, where each feed point is coupled to a corresponding feed line (1211-1213) which is excited by a corresponding antenna port from beamformer ICs, e.g., IC1-IC64 of FIG. 4.

Figure 12B:
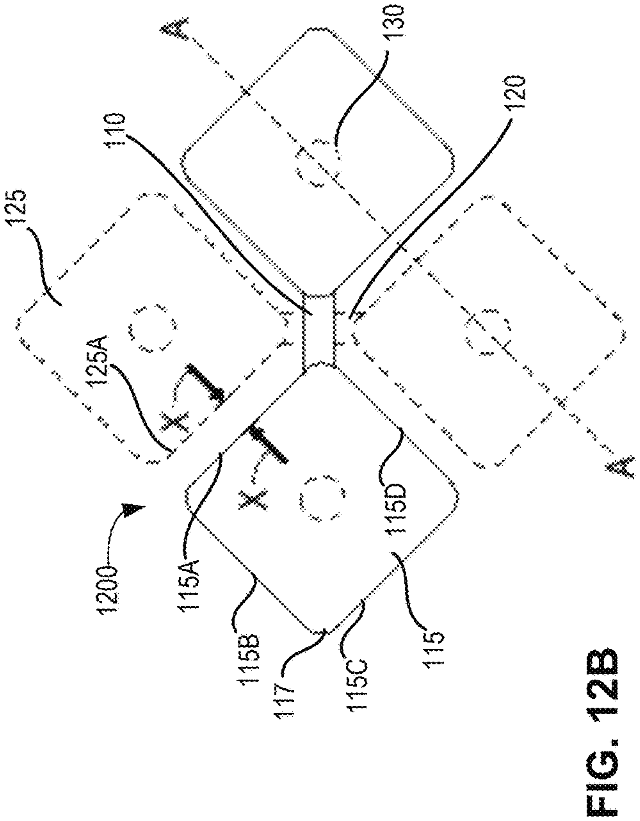
FIGS. 12B-12C are block diagrams illustrating an antenna unit according to one embodiment.
Figure 12C:
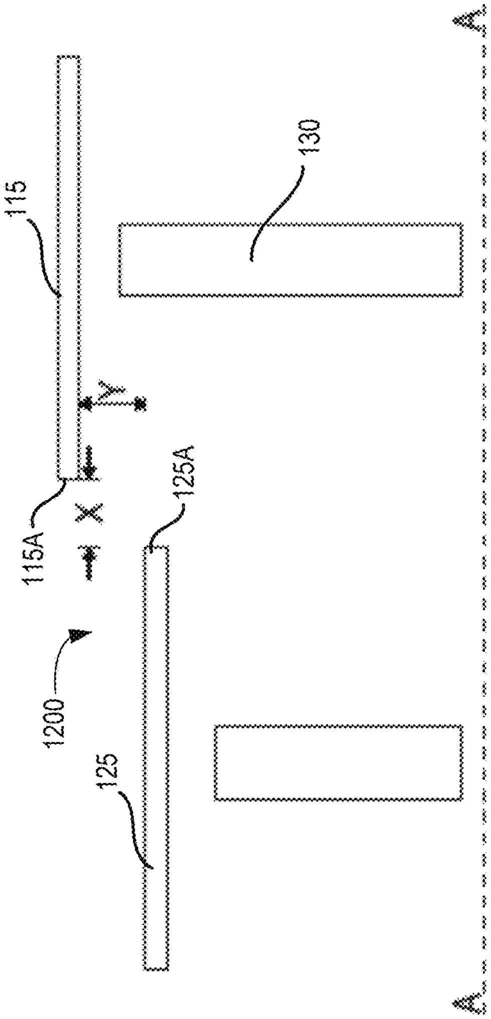

FIGS. 12B-12C are block diagrams illustrating an antenna unit 1200 according to one embodiment. Antenna unit 1200 according to some embodiments may be a wideband, polarization diverse antenna unit.

Polarization diversity can be achieved through two radiating arms 110, 120 arranged in orthogonal fashion on a suitable substrate material, which may be a multi-layer printed circuit board. A first radiating arm 110 may be arranged to have a longitudinal axis extending in a first direction. A second radiating arm 120 may be arranged to have a longitudinal axis extending in a second direction that crosses the first direction. In some embodiments, the longitudinal axis of the first radiating arm 110 may be arranged perpendicularly to the longitudinal axis of the second radiating arm 120.

The first radiating arm 110 may be arranged to be higher (e.g., vertically offset) from the second radiating arm 120. I.e., the first radiating arm 110 may be offset from the second radiating arm in a third direction that is orthogonal to the first and second directions. The offset may be a small fraction of the wavelength at the operating frequencies. In some embodiments, the first radiating arm 110 may be offset from the second radiating arm 120 in the third direction by 0.127 mm to 0.254 mm.

A signal may be applied to the first radiating arm 110 through a first port and feed coupling (e.g., 1201, 1211 of FIG. 12A), where the first radiating arm 110 can be coupled to the first port 1201 by a via layer. A signal may be applied to the second radiating arm 120 through a second port and associated feed coupling (1203, 1213 of FIG. 12A), where the second radiating arm 120 can be coupled to the second port 1203 by a via layer. Orthogonal polarization is obtained by exciting the first and second radiating arms 110, 120 independently through the corresponding ports. In some embodiments, a differential feeding mechanism is adopted to excite the first and second radiating arms 110, 120 over a wide frequency bandwidth. In some embodiments, one of the first and second radiating arms 110, 120 may be provided with a signal that is vertically polarized while the other of the first and second radiating arms 110, 120 is provided with a signal that is horizontally polarized. The embodiments of the present invention are not limited to configurations in which the signal polarizations are horizontal and vertical. In some embodiments, one of the first and second radiating arms 110, 120 may be provided with a first signal that is polarized while the other of the first and second radiating arms 110, 120 is provided with a second signal that is polarized orthogonally to the first signal. In some embodiments, the first and second radiating arms 110, 120 may be configured to support transmission of first and second signals that range from 18 GHz to 30 GHz, 24 GHz to 44 GHZ, 50 GHz to 70 GHz, or other frequency ranges.

FIG. 12B is a plan view illustrating the details of first and second radiating arms 110, 120, while FIG. 12C is a side view taken along line A-A of FIG. 12B. FIGS. 12B-12C are intended to be illustrative of the structure of various elements of the antenna unit 1200 and are not intended to limit the embodiments of the present disclosure. The elements of FIGS. 12B-12C are not intended to be representative of scale. A description of the elements of the FIGS. 12B-12C that have been previously discussed will be omitted, or reduced, for brevity.

Referring to FIG. 12B, the first radiating arm 110 may have first radiating elements 115 on opposing ends of the first radiating arm 110. The second radiating arm 120 may have second radiating elements 125 on opposing ends of the second radiating arm 120. The first and second radiating elements 115, 125 may have various shapes. For example, the first and second radiating elements 115, 125 may have a square or diamond shape, when viewed in plan. In some embodiments, the first radiating elements 115 may have a different shape than the second radiating elements 125.

The first radiating element 115 may have a first outer edge 115A that is adjacent a second outer edge 125A of the second radiating element 125. The first outer edge 115A may be one of a plurality of outer edges of the first radiating element 115. For example, the first radiating element 115 of FIG. 12B is illustrated with four outer edges 115A, 115B, 115C, and 115D, though the embodiments of the present disclosure are not limited thereto. Adjacent ones of the outer edges 115A, 115B, 115C, and 115D may be connected by corners 117. In some embodiments, the corners 117 may be a transition from one outer edge to another. The second outer edge 125A of the second radiating element 125 may similarly be one of a plurality of outer edges of the second radiating element 125, and duplicate description thereof will be omitted.

The first outer edge 115A of the first radiating element 115 may be a closest edge of the plurality of edges of the first radiating element 115 to the second radiating element 125. Similarly, the second outer edge 125A of the second radiating element 125 may be a closest edge of the second radiating element 125 to the first radiating element 115. As will be discussed further with respect to FIG. 12C, the first outer edge 115A of the first radiating element 115 may be diagonally offset from the second outer edge 125A of the second radiating element 125 due to the first radiating element 115 being offset (e.g., vertically) from the second radiating element 125.

The first outer edge 115A of the first radiating element 115 may extend substantially in parallel to the second outer edge 125A of the second radiating element 125 (e.g., when viewed in plan). As used herein, "substantially parallel" means that a distance between the two outer edges 115A, 125A does not vary by more than 10% along the length of the adjacent outer edges 115A, 125A. The parallel arrangement of the first and second outer edges 115A, 125A may assist in improving the performance of the antenna unit 1200. The two outer edges 115A, 125A may be horizontally offset by a small fraction of the wavelength at the operating frequencies. In some embodiments, a horizontal distance X between the first and second outer edges 115A, 125A may be between 0.127 mm and 0.3 mm.

Though the discussion with respect to FIG. 12B focused on the two adjacent outer edges 115A, 125A of the first and second radiating elements 115, 125, it will be understood that other outer edges of the first and second radiating elements 115, 125 may be adjacent to other radiating elements of the first and second radiating arms 110, 120. For example, referring to FIG. 12B, an additional outer edge 115D of the first radiating element 115 is adjacent the opposing second radiating element of the second radiating arm 120. In some embodiments, each of the first radiating elements 115 may have two outer edges that respectively extend substantially parallel to an adjacent outer edge of opposing ones of the second radiating elements 125. Similarly, each of the second radiating elements 125 may have two outer edges that respectively extend substantially parallel to an adjacent outer edge of opposing ones of the first radiating elements 115.

In some embodiments, each of the first and second radiating elements 115, 125 are disposed on parasitic posts 130. In some embodiments, when viewed in plan, the parasitic post 130 may be disposed near a center of the first and second radiating elements 115, 125. In some embodiments, at least a portion of the parasitic post 130 may be vertically overlapped by one of the first and second radiating elements 115, 125.

FIG. 12C illustrates a side view of the antenna unit 1200, including the first and second radiating elements 115, 125. As shown in FIG. 12C, the first radiating element 115 may be offset from the second radiating element 125 in both a first (e.g., a vertical) direction and a second (e.g., a horizontal) direction. For example, the first radiating element 115 may be offset from the second radiating element 125 in the first direction by a distance Y, which may be a small fraction of the wavelength at the operating frequencies. In some embodiments, the distance Y may range from 0.127 mm to 0.254 mm. The first radiating element 115 may also be offset from the second radiating element 125 in the second direction by a distance X, which may be a small fraction of the wavelength at the operating frequencies. In some embodiments. In some embodiments, the distance X may range from 0.127 mm and 0.3 mm. Because of the offsets in the first and second directions, the first and second outer edges 115A, 125A of the first and second radiating elements 115, 125 may be diagonally offset from one another.

In some embodiments, the parasitic post 130 may be offset in the first direction (e.g., the vertical direction) from a respective one of the first and second radiating elements 115, 125. This vertical offset may be a small fraction of the wavelength at the frequency of operation. In some embodiments, the radiating elements 115, 125 of the antenna unit 1200 may be disposed horizontally about a quarter wavelength of the operating frequency from the ground plane, and the height of the vertical parasitic posts 130 may be close to about a quarter wavelength at the frequency of operation. In some embodiments, the vertical offset between the parasitic post 130 in the first direction (e.g., the vertical direction) and a respective one of the first and second radiating elements 115, 125 may be about one percent of a free-space wavelength at the mid frequency of the wideband antenna. In some embodiments, this offset may be approximately 0.127 mm. In some embodiments, the offsets between various ones of the parasitic posts 130 and a first or second radiating element 115, 125 under which it is disposed in substantially the same (e.g., within 10% of one another). In some embodiments, the offsets between various ones of the parasitic posts 130 and a first or second radiating element 115, 125 under which it is disposed may differ from one another (e.g., by more than 10%). In some embodiments, the length in the first direction (e.g., the vertical direction) of a parasitic post 130 that is under one of the second radiating elements 125 is smaller than the length in the first direction (e.g., the vertical direction) of another parasitic post 130 that is under one of the first radiating elements 115, though the embodiments of the present disclosure are not limited thereto.

As previously described, in some embodiments, one or more of the parasitic posts 130 may be omitted. For example, in some embodiments a parasitic post 130 may be under one of the first radiating elements 115 but not under other ones of the first radiating elements 115. Similarly, in some embodiments a parasitic post 130 may be under one of the second radiating elements 125 but not under other ones of the second radiating elements 125. In some embodiments, a parasitic post 130 may be under one or more of the first radiating elements 115 but not under the second radiating elements 125. In some embodiments, the parasitic posts 130 may be omitted altogether.

Figure 13:
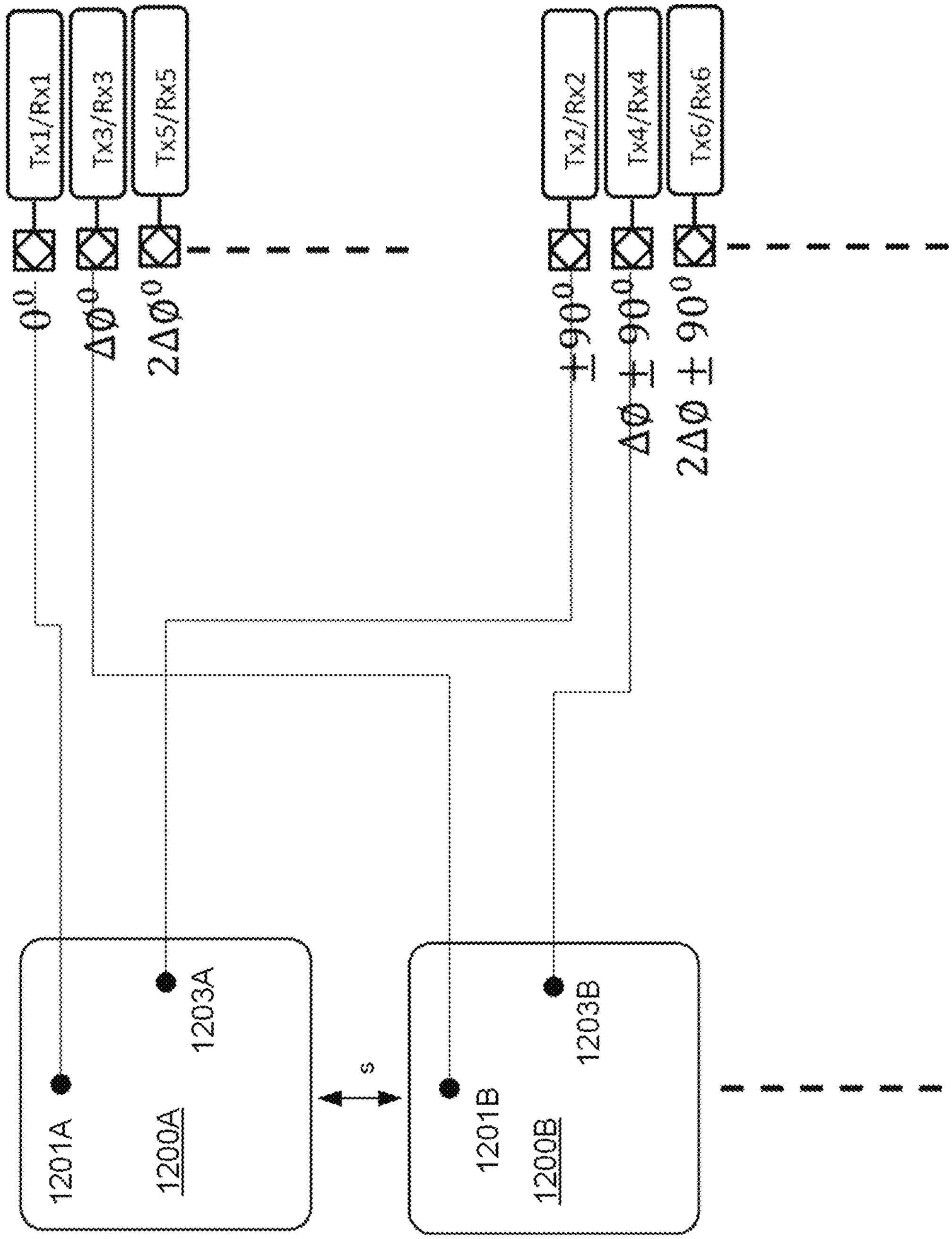
FIG. 13 is a block diagram illustrating transceivers operational for satellite communication according to one embodiment.

FIG. 13 is a block diagram illustrating transceivers operational for satellite communication according to one embodiment. Satellite communication often uses circular polarization (CP) as the type of wave polarization for signal transmission. In CP, a spiral pattern of wave in electric and magnetic fields is created as the wave travels. The direction of rotation determines whether the CP is right-hand circular polarization (RHCP) or left-hand circular polarization (LHCP). In some embodiments, the polarization of satellite communication signals can be linearly polarized (horizontal or vertical), right-hand elliptical polarization, or left-hand elliptical polarization.

Circular polarization for satellite communication can be achieved by providing the antenna terminals of an antenna unit 1200A-1200B with quadrature signals. For example, antenna unit 1200A can be fed at feed 1201A with an RF signal at 0 degrees phase shift (in-phase signal) and can be fed at feed 1203A with an RF signal at 90 degrees phase shift (quadrature signal). Antenna unit 1200B can be fed at feed 1201B with an RF signal at $\Delta\emptyset$ degrees phase shift (in-phase signal with beam steering phase shift) and can be fed at feed 1203B with an RF signal at $90+\Delta\emptyset$ degrees phase shift (quadrature signal with beam steering phase shift), and so forth. Here, beam steering can be achieved by controlling the relative phase, e.g., $\Delta\emptyset$, by the respective RF top (e.g., Tx1/Rx1, Tx3/Rx3, . . . ) and RF bottom (e.g., Tx2/Rx2, Tx4/Rx4, . . . ) transceivers. In some embodiments, the antenna units are spaced apart by approximate s=0.1 to 0.5 of a wavelength for beamforming.

Figure 14:
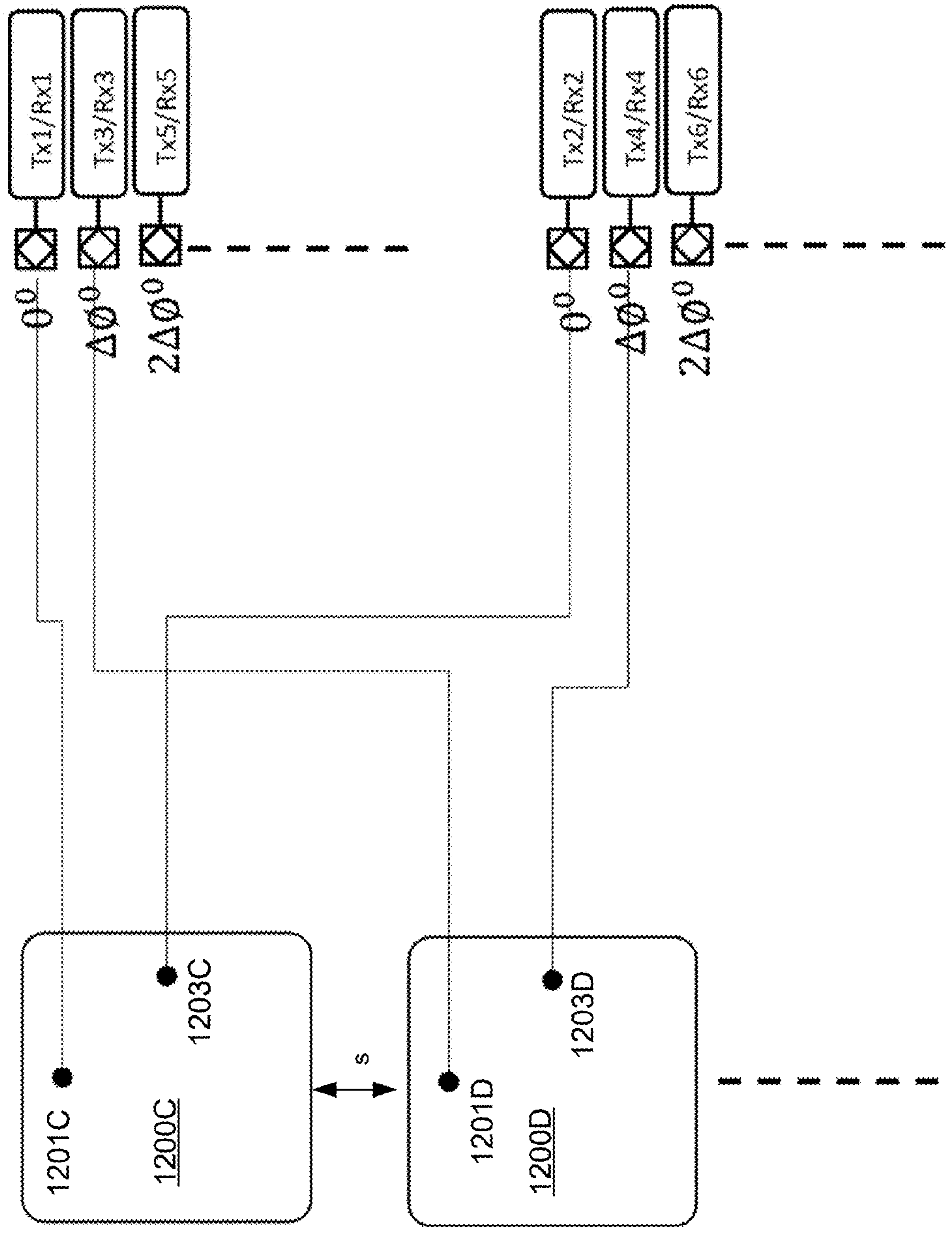
FIG. 14 is a block diagram illustrating transceivers operational for terrestrial communication according to one embodiment.

FIG. 14 is a block diagram illustrating antenna units operational for terrestrial communication according to one embodiment. Terrestrial communication can use linear polarization (LP) as the type of wave polarization for signal transmission. In LP, the electric field vector or magnetic field vector of a signal is confined to a given plane along the direction of propagation. The orientation of a linearly polarized electromagnetic wave is defined by the direction of the electric field vector. For example, if the electric field vector is vertical (alternately up and down as the wave travels) the radiation is said to be vertically polarized. In some embodiments, the polarization of terrestrial communication signals can be circularly polarized (right-hand or left-hand) or elliptically polarized (right-hand or left-hand). Terrestrial communication can include 5G, 5.5G, or 6G wireless technology and beyond.

Referring to FIG. 14, linear horizontal/vertical (H/V) polarizations of the signals at the antenna units can be achieved by exciting antenna unit 1200C-1200D with non-quadrature signals. For example, antenna unit 1200C can be fed at both feeds 1201C-1203C with an RF signal at 0 degrees phase shift (in-phase signal). Antenna unit 1200D can be fed at both feeds 1201D and 1203D with an RF signal at $\Delta\emptyset$ degrees phase shift (in-phase signal with beam steering phase shift), and so forth. Note that, unlike circular polarization, no quadrature signal is needed to excite the antenna units for the linear polarization. Here, beam steering can be achieved by controlling the relative phase, e.g., $\Delta\emptyset$, by the respective RF top (e.g., Tx1/Rx1, Tx3/Rx3, . . . ) and RF bottom (e.g., Tx2/Rx2, Tx4/Rx4, . . . ) transceivers. In some embodiments, the antenna units are spaced apart by approximate s=0.1 to 0.5 of a wavelength for beamforming.

Figure 15:
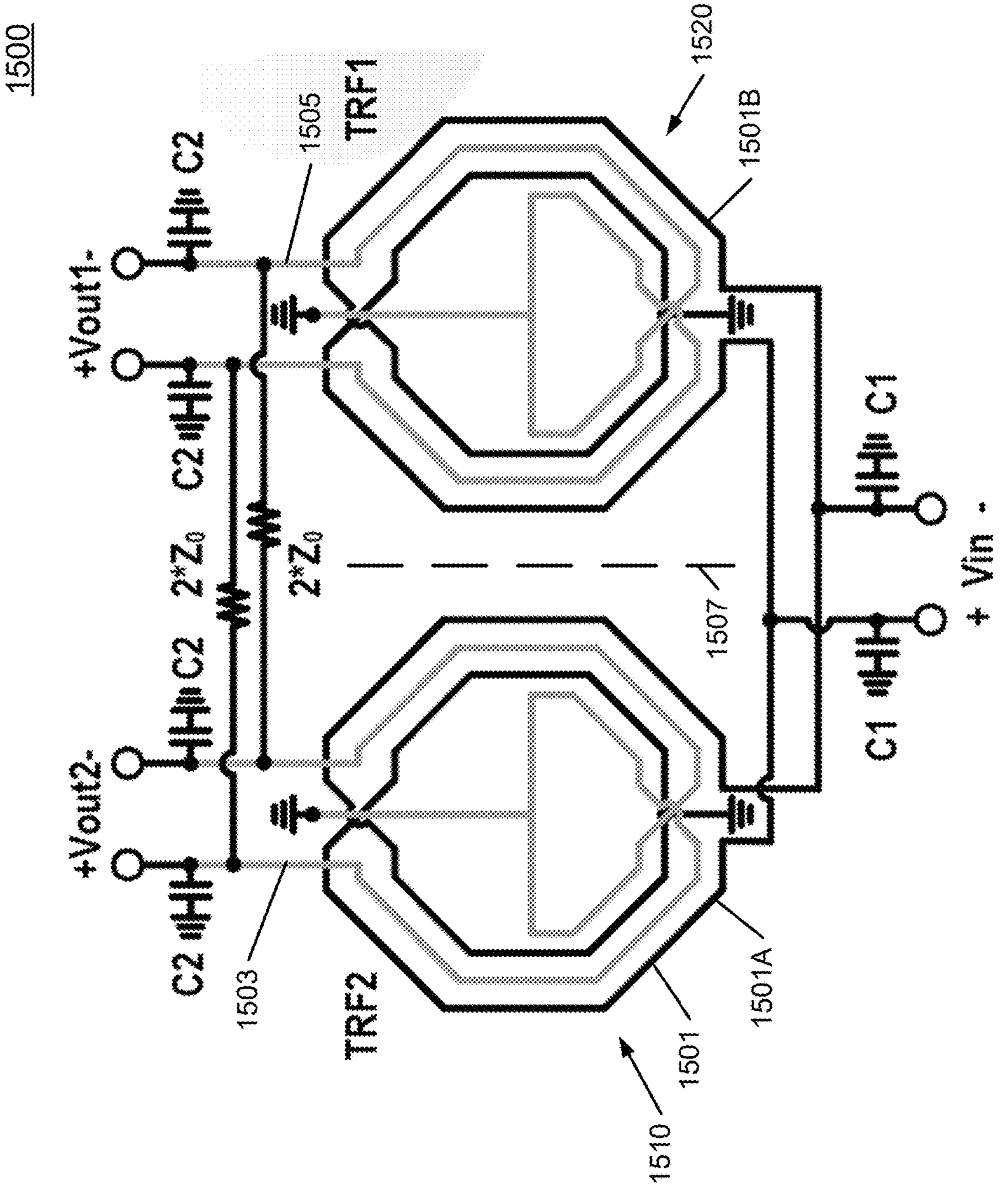
FIG. 15 is a circuit diagram illustrating a 2-to-1 Wilkinson power divider/combiner according to one embodiment.

FIG. 15 is a circuit diagram illustrating a 2-to-1 Wilkinson power divider/combiner (WPDC) 1500 according to one embodiment. WPDC 1500 can be a 2-to-1 differential circuit that power combines two differential signals (at ports Vout1, Vout2) into a single differential signal (at port Vin) and/or divides a single differential signal (at port Vin) into two differential signals (at ports Vout1, Vout2) with same signal characteristics and about half the power. In one embodiment, WPDC 1500 includes transformer windings 1501-1505. Transformer winding 1501 can include a first portion 1501A wounded two revolutions at TRF2 and a second portion 1501B wounded two revolutions at TRF1, first portion and second portion forming a closed loop. The shapes of TRF1/TRF2 can be polygonal, circular, or of other shapes. Here, TRF1/TRF2 shown in FIG. 15 are of octagonal shaped. In one embodiment, first portion 1501A is equal in length to second portion 1501B and the two portions 1501A-1501B are substantially symmetrically along a vertical center axis 1507. In one embodiment, transformer winding 1501 is grounded at about a mid-point of first portion 1501A. In one embodiment, transformer winding 1501 is grounded at about a mid-point of second portion 1501A. In one embodiment, transformer winding 1501 includes a first end in between first portion 1501A and second portion 1501B and the first end is coupled to port Vin+. In one embodiment, transformer winding 1501 includes a second end in between first portion 1501A and second portion 1501B and the second end is coupled to port Vin−. In one embodiment, a matching network is coupled to the transformer winding 1501 for impedance matching at ports Vin+, Vin− to match to impedance $z_0$. In one embodiment, a pair of capacitors C1 are coupled between the first end and a ground, and the second end and a ground. Here, C1 can be symmetric among the two differential ports in the layout for the WPDC. In one embodiment, C1 can equal to $1/\omega_0 z_0$, where $z_0$ is a matching characteristic impedance (typically 50 ohms), and $w_0$ is the operating center frequency of the WPDC.

In one embodiment, transformer winding 1503 are magnetically coupled to first portion 1501A of transformer winding 1501 at TRF2. Transformer winding 1503 can wound one and a half revolution around first portion 1501A. In one embodiment, the half revolution of winding 1503 is disposed near port Vin+. In one embodiment, a mid-point of winding 1503 is grounded. The first end of winding 1503 can be port Vout1+ and the second end of winding 1503 can be port Vout1−. In one embodiment, a matching network is coupled to the transformer winding 1503 for impedance matching of ports Vout1+, Vout1− to match to impedance $z_0$. In one embodiment, WPDC 1500 includes a first pair of capacitors C2, where a capacitor C2 of the first pair is coupled between a first end of winding 1503 and a ground, and another capacitor C2 of the first pair is coupled between a second end of winding 1503 and a ground. C2 can be selected to tune Vout1+/Vout1− ports for impedance matching.

In one embodiment, transformer winding 1505 are magnetically coupled to second portion 1501B of transformer winding 1501 at TRF1. Transformer winding 1505 can wound one and a half revolution around first portion 1501B. In one embodiment, the half revolution of winding 1505 is disposed near port Vin−. In one embodiment, a mid-point of winding 1505 is grounded. The first end of winding 1505 can be port Vout2+ and the second end of winding 1505 can be port Vout2−. In one embodiment, a matching network is coupled to the transformer winding 1505 for impedance matching of ports Vout1+, Vout1− to match to impedance $z_0$. In one embodiment, WPDC 1500 includes a second pair of capacitors C2, where a capacitor C2 of the second pair is coupled between a first end of winding 1505 and a ground, and another capacitor C2 of the second pair is coupled between a second end of winding 1505 and a ground. Here, C2 can be symmetric among the Vout1+, Vout1−, Vout2+, and Vout2− ports. In one embodiment, C2 can be selected to tune Vout2+/Vout2− ports for impedance matching.

In one embodiment, the first ends of windings 1503-1505 are coupled in between a resistance of $2*z_0$ where $z_0$ is a matching impedance value. the matching impedance value can be 25 ohms, 50 ohms, or 75 ohms. In one embodiment, the second ends of winding 1503-1505 are coupled in between another resistance of $2*z_0$. In some embodiments, the resistances of $2*z_0$ can be implemented as metal strip lines.

Figure 16:
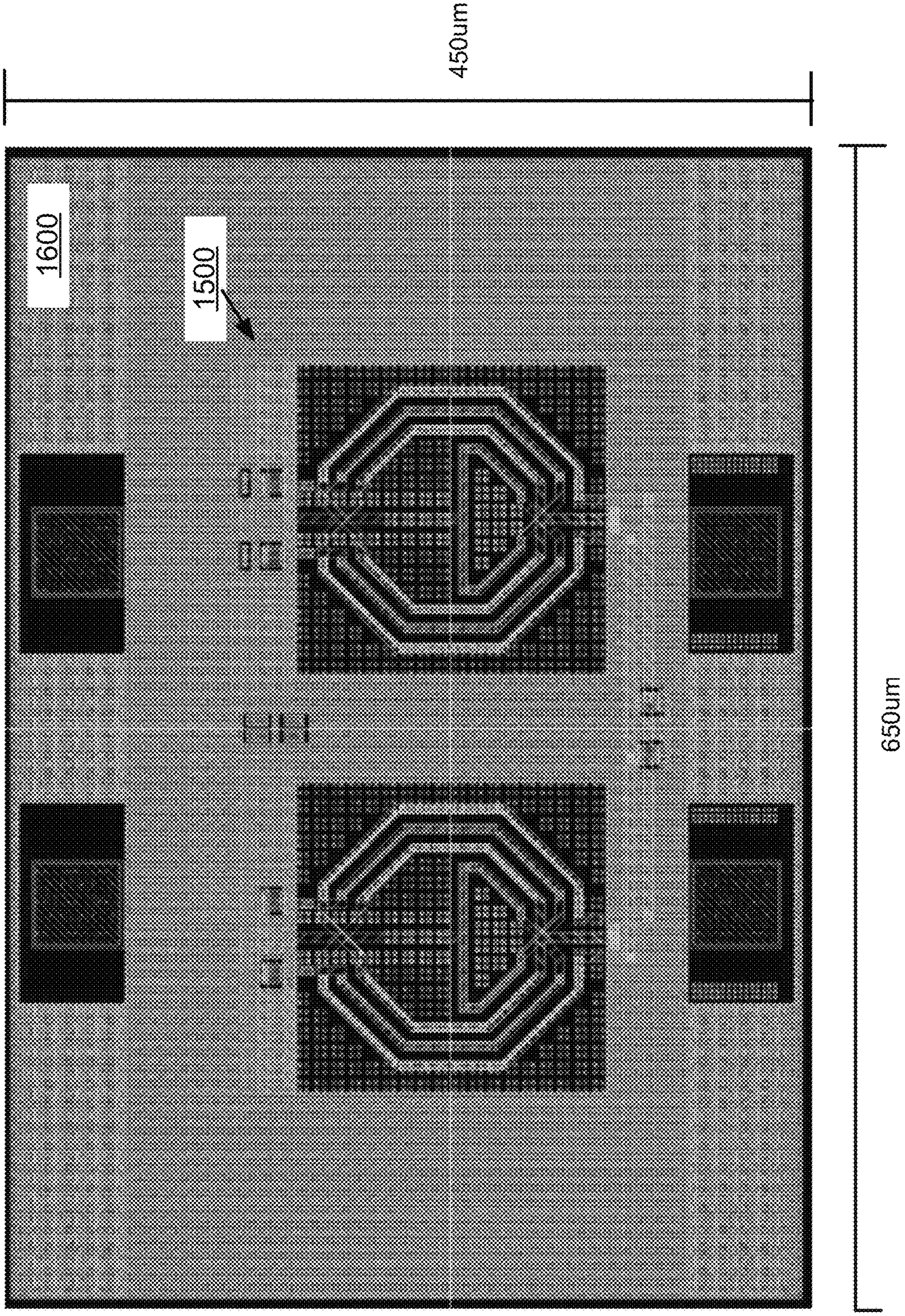
FIG. 16 is a block diagram for a Wilkinson power divider/combiner layout according to one embodiment.
Figure 17:
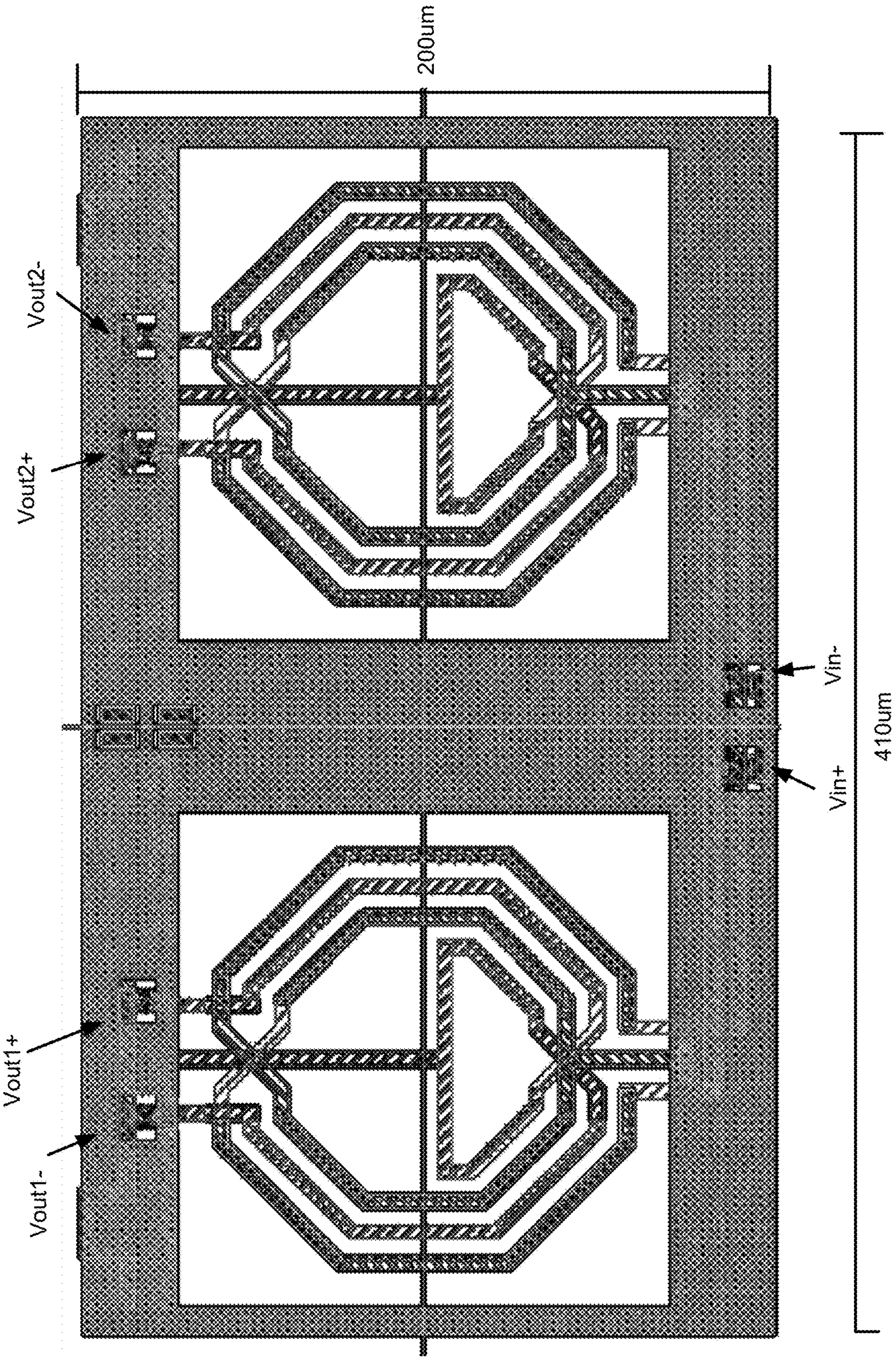
FIG. 17 is a layout diagram illustrating the input/output ports of the Wilkinson power divider/combiner of FIG. 16.
Figure 18A:
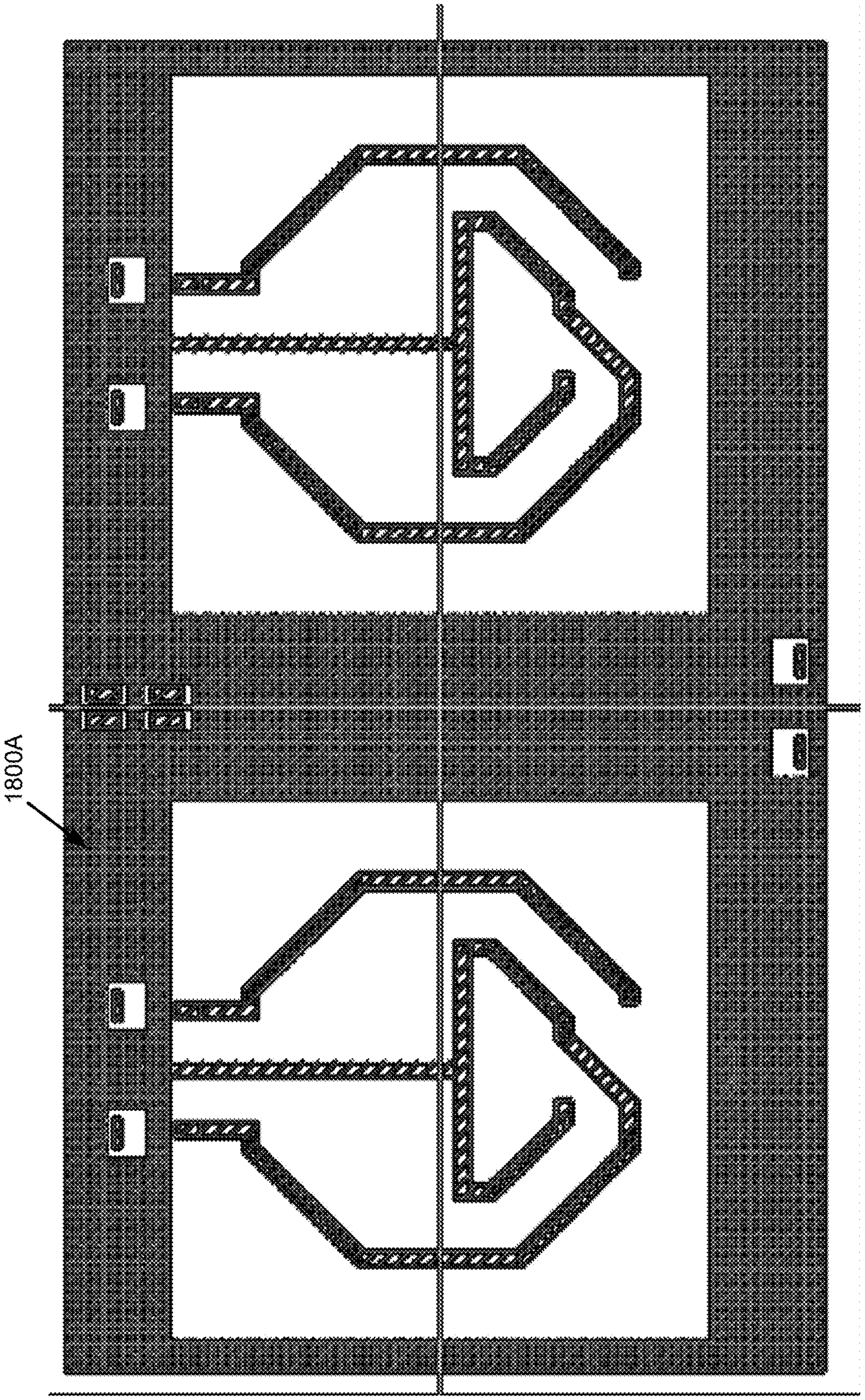
FIGS. 18A-18D illustrate metal layers for the 2-to-1 Wilkinson power divider/combiner of FIG. 16.
Figure 18B:
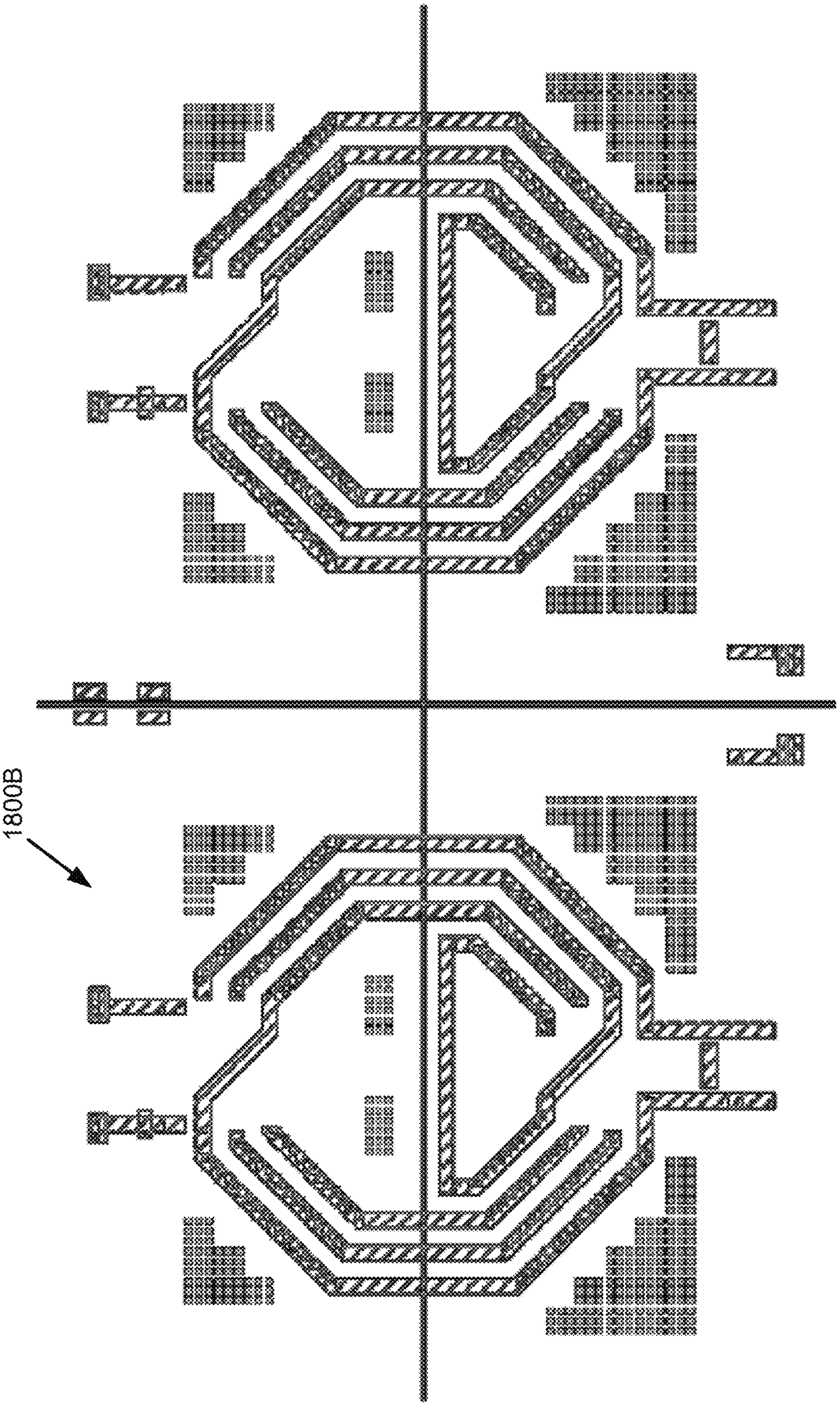
Figure 18C:
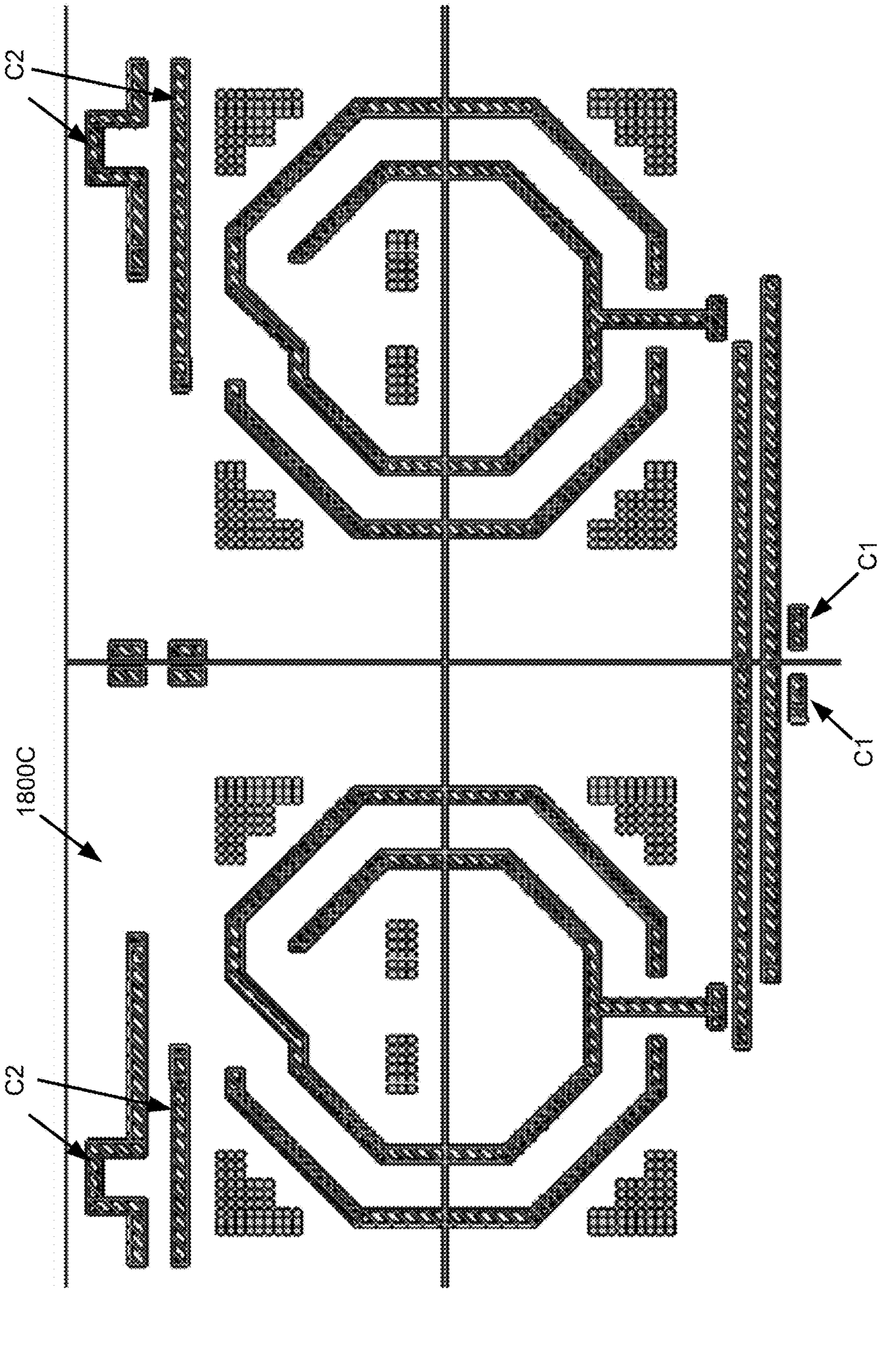
Figure 18D:
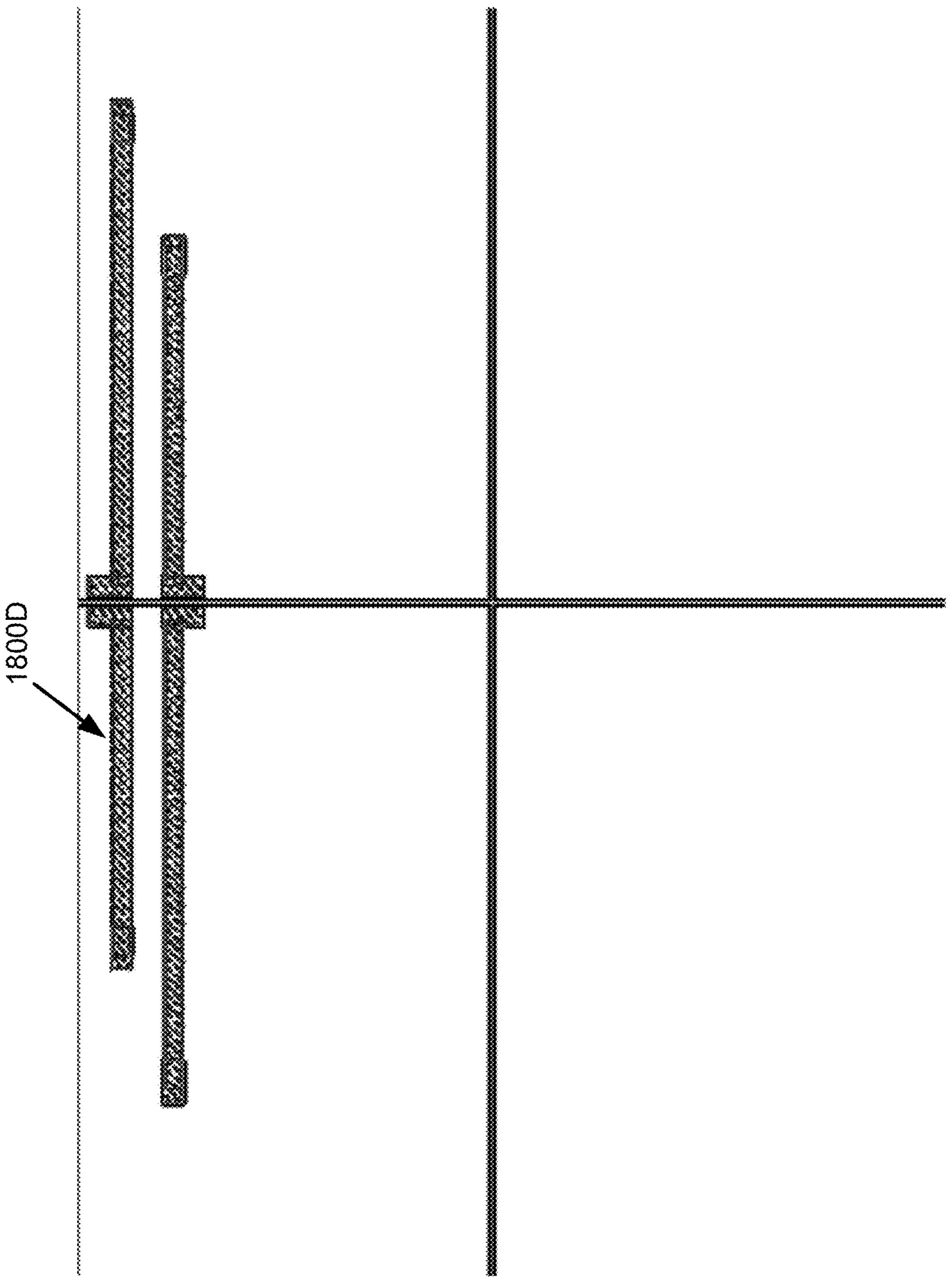

FIG. 16 is a block diagram for a 2-to-1 Wilkinson power divider/combiner layout 1600 according to one embodiment. FIG. 17 is a layout diagram illustrating the input/output ports of the Wilkinson power divider/combiner of FIG. 16.

As shown in FIG. 16, layout 1600 can include WPDC circuit 1500. In one embodiment, layout 1600 has a dimension of approximately 450 μm by 650 μm including the pads for ball point/wire connections. In some embodiments, layout for the footprint of WPDC 1500 can be approximately 200 μm by 410 μm without the paddings, as shown in FIG. 17. WPDC 1500 can include two transformers (TRF1 and TRF2) situated side-by-side where TRF1 and TRF2 each has a footprint of approximately 200 μm by 205 μm.

FIGS. 18A-18D illustrate metal layers for the 2-to-1 Wilkinson power divider/combiner of FIG. 16. The metal layers 1800A-1800D can be consecutive copper layers of a CMOS IC separated by insulating layers. For example, layers 1800A-1800D can be disposed on a silicon substrate, masked and etched to their desired shapes. The connections between two consecutive layers can be etched by vias.

In one embodiment, the composition of WPDC 1500 has 4 metal layers. In some embodiments, secondary windings 1503-1505 are disposed on layers 1800A-1800B. In some embodiments, primary winding 1501 is disposed on layers 1800B-1800C. In some embodiments, capacitances C1-C2 for windings 1501-1505 are disposed on layer 1800C as metal stubs. In one embodiment, a fourth layer 1800D includes metal lines for impedances $2*z_0$ that are disposed between the ends of secondary transformer windings 1503-1505.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A millimeter wave (mmWave) antenna unit, comprising:

at least one dual-polarized radiating element having a dual feed including a first feed point and a second feed point;

a first antenna feed line coupled to the at least one dual-polarized radiating element at the first feed point; and a second antenna feed line coupled to the at least one dual-polarized radiating element at the second feed point, wherein the at least one dual-polarized radiating element transmits/receives a first signal through the first antenna feed line from a first antenna port at a first time moment, and the at least one dual-polarized radiating element transmits/receives a third signal through the first and second antenna feed lines from the first and second antenna ports at a third time moment, wherein the first time moment is different than the third time moment, wherein the first signal is of a first polarization and the third signal is of a third polarization, and wherein the first signal is used for cellular communication, and the third signal is used for low earth orbit satellite communication; or the at least one dual-polarized radiating element transmits/receives a second signal through the second antenna feed line from a second antenna port at a second time moment, and the at least one dual-polarized radiating element transmits/receives a third signal through the first and second antenna feed lines from the first and second antenna ports at a third time moment, wherein the second time moment is different than the third time moment, wherein the second signal is of a second polarization, and the third signal is of a third polarization, and wherein the second signal is used for cellular communication, and the third signal is used for low earth orbit satellite communication.

2. The antenna unit of claim 1, wherein the first signal or the second signal is a transmit/receive packet from a cellular tower at the first or second time moment, wherein the third signal is a transmit/receive packet from a low earth orbit satellite at the third time moment.

3. The antenna unit of claim 1, wherein the at least one dual-polarized radiating element comprises a square-shaped planar radiating element with the first feed point adjacent to the second feed point, and the first and second feed points situated on a surface of the planar radiating element.

4. The antenna unit of claim 1, wherein the at least one dual-polarized radiating element comprises:

a first radiating element;

a second radiating element;

a first radiating arm coupled to the first radiating element; and a second radiating arm coupled to the second radiating element, wherein the second radiating arm is arranged orthogonally to the first radiating arm and is separated from the first radiating arm, wherein the first feed point is adopted to excite the first radiating arm and the second feed point is adopted to excite the second radiating arm.

5. The antenna unit of claim 1, wherein operating frequencies of the antenna unit is approximately 18 GHz to 30 GHz, or 24 GHz to 44 GHz, or 50 GHz to 70 GHz.

6. The antenna unit of claim 1, wherein the first polarization is a linear vertical polarization, the second polarization is a linear horizontal polarization, and the third polarization is a left-handed circular, right-handed circular, left-handed elliptical, or right-handed elliptical polarization.

7. The antenna unit of claim 1, wherein, for transmission of the third signal, the third signal is converted into the a signal of the first polarization and the a signal of the second polarization as respective baseband signals by a baseband processor.

8. An antenna system, comprising:

a plurality of millimeter wave (mmWave) antenna units, each antenna unit operating with a phase shift relationship to an adjacent of the plurality of antenna units and each of the plurality of antenna units comprises:

at least one dual-polarized radiating element having a dual feed including a first feed point and a second feed point;

a first antenna feed line coupled to the at least one dual-polarized radiating element at the first feed point; and a second antenna feed line coupled to the at least one dual-polarized radiating element at the second feed point, wherein the at least one dual-polarized radiating element transmits/receives a first signal through the first antenna feed line from a first antenna port at a first time moment, and the at least one dual-polarized radiating element transmits/receives a third signal through the first and second antenna feed lines from the first and second antenna ports at a third time moment, wherein the first time moment is different than the third time moment, wherein the first signal is of a first polarization and the third signal is of a third polarization, and wherein the first signal is used for cellular communication, and the third signal is used for low earth orbit satellite communication; or the at least one dual-polarized radiating element transmits/receives a second signal through the second antenna feed line from a second antenna port at a second time moment, and the at least one dual-polarized radiating element transmits/receives a third signal through the first and second antenna feed lines from the first and second antenna ports at a third time moment, wherein the second time moment is different than the third time moment, wherein the second signal is of a second polarization, and the third signal is of a third polarization, and wherein the second signal is used for cellular communication, and the third signal is used for low earth orbit satellite communication, and wherein signals of a subset of the plurality of antenna units are combined coherently to form a first radiating pattern for the cellular communication and signals of the plurality of antenna units are combined coherently to form a second radiating pattern for the low earth orbit satellite communication.

9. A radio frequency (RF) frontend, comprising:

an antenna system, comprising:

a plurality of millimeter wave (mmWave) antenna units, each antenna unit operating with a phase shift relationship to an adjacent of the plurality of antenna units and each of the plurality of antenna units comprises:

at least one dual-polarized radiating element having a dual feed including a first feed point and a second feed point;

a first antenna feed line coupled to the at least one dual-polarized radiating element at the first feed point; and a second antenna feed line coupled to the at least one dual-polarized radiating element at the second feed point, wherein the at least one dual-polarized radiating element transmits/receives a first signal through the first antenna feed line from a first antenna port at a first time moment, and the at least one dual-polarized radiating element transmits/receives a third signal through the first and second antenna feed lines from the first and second antenna ports at a third time moment, wherein the first time moment is different than the third time moment, wherein the first signal is of a first polarization and the third signal is of a third polarization, and wherein the first signal is used for cellular communication, and the third signal is used for low earth orbit satellite communication; or the at least one dual-polarized radiating element transmits/receives a second signal through the second antenna feed line from a second antenna port at a second time moment, and the at least one dual-polarized radiating element transmits/receives a third signal through the first and second antenna feed lines from the first and second antenna ports at a third time moment, wherein the second time moment is different than the third time moment, wherein the second signal is of a second polarization, and the third signal is of a third polarization, and wherein the second signal is used for cellular communication, and the third signal is used for low earth orbit satellite communication;

a plurality of first transceivers to transmit/receive first-signals in a first polarization, each first transceiver being coupled to a respective first antenna port of an antenna unit of the plurality of antenna units; and a plurality of second transceivers to transmit/receive signals in a second polarization, each second transceiver being coupled to a respective second antenna port of an antenna unit of the plurality of antenna units, wherein signals of a subset of the plurality of antenna units are combined coherently to form a first radiating pattern for the cellular communication and signals of the plurality of antenna units are combined coherently to form a second radiating pattern for the low earth orbit satellite communication.

10. The RF frontend of claim 9, further comprising:

a first power divider combiner (PDC) system coupled to the first transceivers to combine a plurality of signals into one signal or divide a signal into a plurality of signals in the first polarization or the third polarization; and a second PDC system coupled to the second transceivers to combine a plurality of signals into one signal or divide a signal into a plurality of signals in the second polarization or the third polarization.

11. The RF frontend of claim 10, wherein each of the one signal and the plurality of signals are differential signals.

12. The RF frontend of claim 10, further comprising a first up/down converter (UDC) coupled to the first PDC system and a second up/down converter (UDC) coupled to the second PDC system.

13. The RF frontend of claim 10, further comprising a controller that enables/disables transmission of a signal to each of the plurality of antenna units, and the controller further configures the first and/or second transceivers to switch to transmit mode or receive mode.

14. The RF frontend of claim 9, wherein a count of the plurality of millimeter wave (mmWave) antenna units is N, and wherein each of the plurality of antenna units is coupled to a corresponding first transceiver and a corresponding second transceiver, wherein N is an integer number.

15. The RF frontend of claim 14, wherein N is 512 and 8 antenna units are coupled to each first integrated circuit (IC) of 64 first ICs.

16. The RF frontend of claim 15, wherein the first and second transceivers are disposed on one or more of the first integrated circuits (ICs).

17. The RF frontend of claim 16, wherein the first and the second PDC systems are disposed on the plurality of first ICs and/or a portion of the first and the second PDC systems are disposed on a plurality of second ICs.

18. The RF frontend of claim 17, wherein a first up/down converter (UDC) and a second up/down converter (UDC) are disposed on a third IC.

19. The RF frontend of claim 9, wherein operating frequencies of the antenna unit is approximately 18 GHz to 30 GHz, or 24 GHz to 44 GHz, or 50 GHz to 70 GHz.

20. The RF frontend of claim 9, wherein the first polarization is a linear vertical polarization, the second polarization is a linear horizontal polarization, and the third polarization is a left-handed circular, right-handed circular, left-handed elliptical, or right-handed elliptical polarization.

* * * * *